United States Patent
Akkarakaran et al.

(10) Patent No.: US 9,491,707 B2
(45) Date of Patent: Nov. 8, 2016

(54) CONTROL CHANNEL SIGNALING AND POWER CONTROL WITH DISCONTINUOUS TRANSMISSIONS ON DEDICATED CHANNELS TO REDUCE CURRENT CONSUMPTION DURING VOICE CALLS

(71) Applicant: QUALCOMM Incorporated, San Diego, CA (US)

(72) Inventors: Sony Akkarakaran, Poway, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 14/556,950

(22) Filed: Dec. 1, 2014

(65) Prior Publication Data

US 2015/0156726 A1 Jun. 4, 2015

Related U.S. Application Data

(60) Provisional application No. 61/910,735, filed on Dec. 2, 2013.

(51) Int. Cl.
*H04Q 7/00* (2006.01)
*H04W 52/06* (2009.01)
(Continued)

(52) U.S. Cl.
CPC ........... *H04W 52/06* (2013.01); *H04W 28/065* (2013.01); *H04W 52/26* (2013.01); *H04W 52/44* (2013.01); *H04W 76/048* (2013.01)

(58) Field of Classification Search
USPC ........................................................ 455/522
See application file for complete search history.

(56) References Cited

U.S. PATENT DOCUMENTS

| 6,556,567 B1 * | 4/2003 | Murakami | H04Q 11/0478 370/394 |
| 7,539,157 B2 * | 5/2009 | Ohsuge | H04W 52/12 370/328 |
| 2003/0036403 A1 * | 2/2003 | Shiu | H04W 52/12 455/522 |

(Continued)

FOREIGN PATENT DOCUMENTS

| EP | 1 143 634 A1 | 10/2001 |
| WO | WO-2008/036366 A2 | 3/2008 |

OTHER PUBLICATIONS

Partial International Search Report—PCT/US2014/068233—ISA/EPO—May 15, 2015. (6 total pages).

(Continued)

*Primary Examiner* — Duc C Ho
(74) *Attorney, Agent, or Firm* — Arent Fox LLP

(57) ABSTRACT

Methods and apparatuses for uplink and downlink wireless communication are presented. For example, a method of uplink mobile communication at a user equipment is presented, which may include compressing two consecutive voice packets having a first voice packet transmission time interval into two compressed voice packets having a second voice packet TTI. In addition, the method may include compressing signaling data corresponding to a first dedicated control channel (DCCH) TTI into compressed signaling data having a second DCCH TTI and multiplexing the two compressed voice packets and the compressed signaling data to form a multiplexed packet. Furthermore, the method may include splitting the multiplexed packet into a first and second subpacket, transmitting the first subpacket during a first subpacket interval having a subpacket TTI, and transmitting the second subpacket during a second subpacket interval subsequent to the first subpacket interval, wherein the second subpacket interval has the subpacket TTI.

30 Claims, 13 Drawing Sheets

(51) Int. Cl.
*H04W 52/26* (2009.01)
*H04W 52/44* (2009.01)
*H04W 28/06* (2009.01)
*H04W 76/04* (2009.01)

(56) References Cited

U.S. PATENT DOCUMENTS

2005/0249149 A1* 11/2005 Kasturi ............... H04W 52/367
 370/328

2012/0195280 A1* 8/2012 Wu ..................... H04L 1/0009
 370/329
2014/0036833 A1* 2/2014 Gunnarsson .......... H04W 52/12
 370/329

OTHER PUBLICATIONS

International Search Report and Written Opinion—PCT/US2014/068233—ISA/EPO—Jul. 21, 2015. (16 total pages).

* cited by examiner

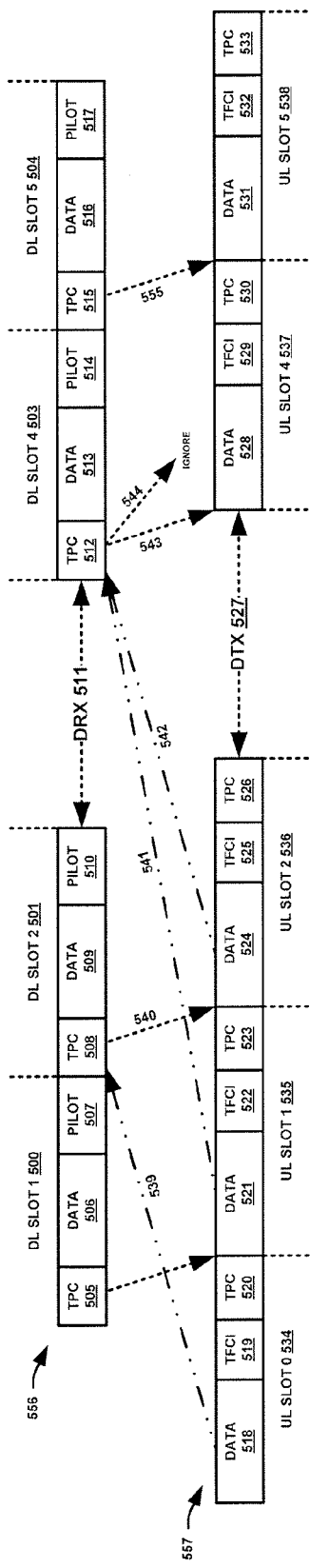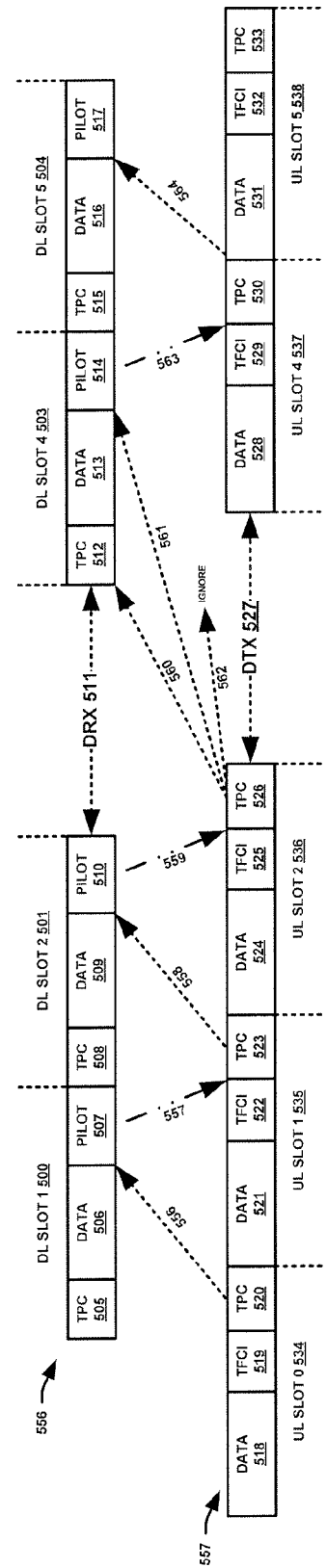
FIG. 5A
FIG. 5B

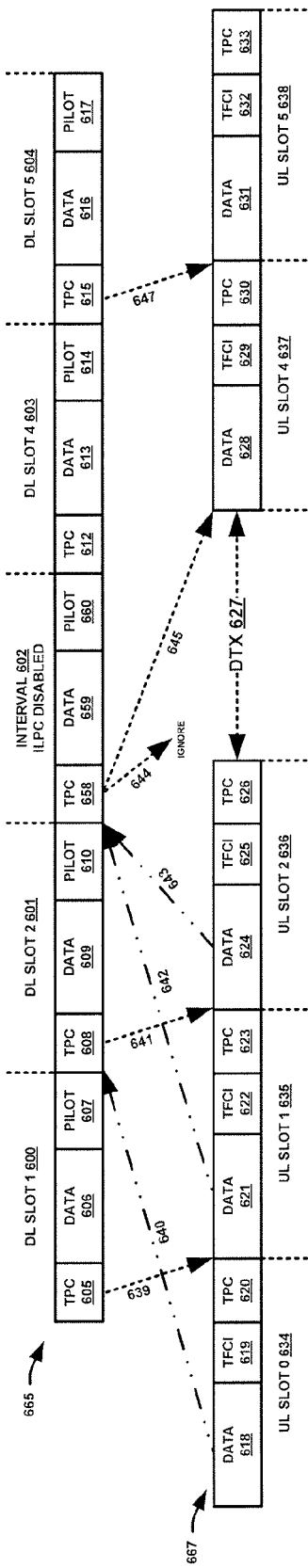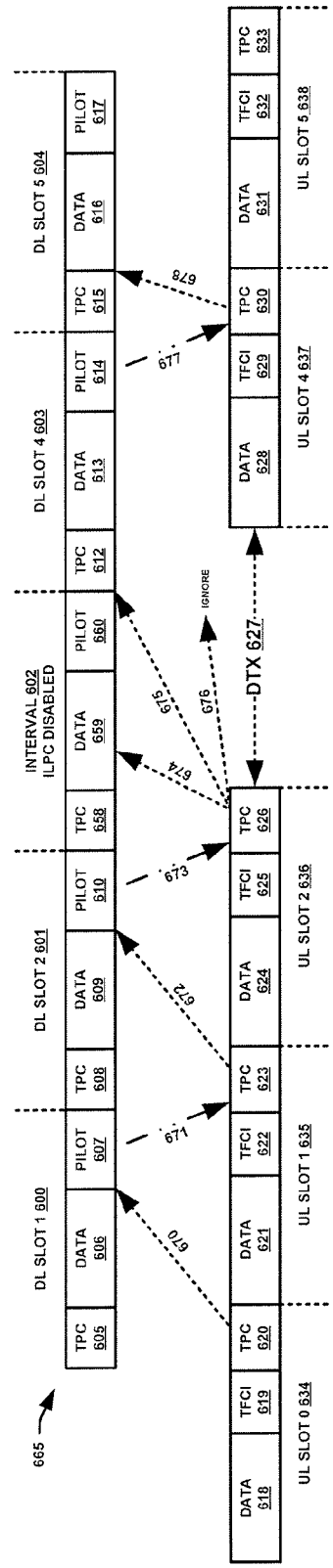

CONTROL CHANNEL SIGNALING AND POWER CONTROL WITH DISCONTINUOUS TRANSMISSIONS ON DEDICATED CHANNELS TO REDUCE CURRENT CONSUMPTION DURING VOICE CALLS

CROSS REFERENCE TO RELATED APPLICATIONS

The present application for patent claims priority to Provisional Application No. 61/910,735 entitled "CONTROL-CHANNEL SIGNALING AND POWER-CONTROL WITH DISCONTINUOUS TRANSMISSIONS ON DEDICATED CHANNELS TO REDUCE CONSUMPTION DURING VOICE CALLS" filed Dec. 2, 2013, and assigned to the assignee hereof and hereby expressly incorporated by reference herein.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In some communication schemes, a transmission time interval (TTI) for packet transmission and reception may be reduced in one or both of the uplink and downlink to reduce current consumption in user equipment (UE). As the TTI is reduced, however, control signaling that is multiplexed with the reduced-TTI packets may become compromised.

As the demand for mobile broadband access continues to increase, research and development continue to advance the UMTS technologies not only to meet the growing demand for mobile broadband access, but to advance and enhance the user experience with mobile communications. Thus, a need exists for methods and apparatuses that improve control channel signaling and inner-loop power control in reduced-TTI communication scenarios.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving wireless communication functionality associated with UEs and network entities in wireless communication networks.

In an aspect of the present disclosure, a method of uplink mobile communication at a UE is presented. Such an aspect may include compressing two consecutive voice packets having a first voice packet TTI into two compressed voice packets having a second voice packet TTI. In addition, the method may include compressing signaling data corresponding to a first dedicated control channel (DCCH) TTI into compressed signaling data having a second DCCH TTI. Furthermore, the example method may include multiplexing the two compressed voice packets and the compressed signaling data to form a multiplexed packet and splitting the multiplexed packet into a first subpacket and a second subpacket. Moreover, the example method may include transmitting the first subpacket during a first subpacket interval having a subpacket TTI and transmitting the second subpacket during a second subpacket interval subsequent to the first subpacket interval, wherein the second subpacket interval has the subpacket TTI.

In a further aspect of the present disclosure, an apparatus is presented that may include a voice packet compression component configured to compress two consecutive voice packets having a first voice packet TTI into two compressed voice packets having a second voice packet TTI. In addition, the example apparatus may include a signaling data compression component configured to compress signaling data corresponding to a first DCCH TTI into compressed signaling data having a second DCCH TTI and a multiplexing component configured to multiplex the two compressed voice packets and the compressed signaling data to form a multiplexed packet. Furthermore, the example apparatus may include a packet splitting component configured to split the multiplexed packet into a first subpacket and a second subpacket. Moreover, the example apparatus may include a transmitting component configured to transmit the first subpacket during a first subpacket interval having a subpacket TTI and to transmit the second subpacket during a second subpacket interval subsequent to the first subpacket interval, wherein the second subpacket interval has the subpacket TTI.

Furthermore, the present disclosure presents an example apparatus for uplink mobile communication. The example apparatus may include means for compressing two consecutive voice packets having a first voice packet TTI into two compressed voice packets having a second voice packet TTI. In addition, the example apparatus may include means for compressing signaling data corresponding to a first DCCH TTI into compressed signaling data having a second DCCH TTI. Furthermore, the example apparatus may include means for multiplexing the two compressed voice packets and the compressed signaling data to form a multiplexed packet and means for splitting the multiplexed packet into a first subpacket and a second subpacket. Additionally, the example apparatus may include means for transmitting the first subpacket during a first subpacket interval having a subpacket TTI and means for transmitting the second subpacket during a second subpacket interval subsequent to the first subpacket interval, wherein the second subpacket interval has the subpacket TTI.

In a further aspect of the present disclosure, a method of mobile communication at a network entity is presented. In an aspect, the example method may include transmitting, at a power level, one or more packets to a UE on a downlink communication channel during a first transmission interval. In addition, the example method may include disabling inner-loop power control for the downlink communication channel over a second transmission interval. Furthermore, the example method may include receiving, during the second transmission interval, a first transmission power control (TPC) command from the UE and adjusting the power level to an adjusted power level based on the first TPC command. Additionally, the example method may include transmitting, at the adjusted power level, one or more packets to the UE on the downlink communication channel.

Moreover, the present disclosure presents a method of inner-loop power control for discontinuous wireless signal transmission, which may include transmitting, at a power level, one or more signals on a dedicated communication channel during a first transmission interval. In addition, the example method may include pausing transmission on the dedicated communication channel during a discontinuous transmission (DTX) interval following the first transmission interval. Furthermore, the example method may include receiving, during the DTX interval, a TPC command, wherein the TPC command is based on a quality metric of at least one of the one or more signals. In addition, the example method may include adjusting the power level to an adjusted power level based on the TPC command and transmitting, at the adjusted power level, one or more further signals on the dedicated communication channel during a second transmission interval following the DTX interval.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A illustrates a power control procedure according to the present disclosure;

FIG. 5B illustrates a power control procedure according to the present disclosure;

FIG. 6A illustrates a power control procedure according to the present disclosure;

FIG. 6B illustrates a power control procedure according to the present disclosure;

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure presents methods and apparatuses for improved control channel signaling and power control that may be implemented in reduced-TTI scenarios. For example, a UE or network entity of the present disclosure may be configured to reduce the TTI of control channel signals, which may be transmitted via a dedicated control channel (DCCH). In an aspect, the reduced-TTI control channel waveform may be multiplexed with one or more data packets (e.g., voice packets) and the multiplexed waveform may be split into a plurality of subpackets. These subpackets may be separated in time by one or more discontinuous transmission (DTX) periods in the uplink or one or more discontinuous reception (DRX) periods in the downlink. For purposes of the present disclosure, this intermittent transmission of the control information in the downlink may be referred to as "intermittent transmission mode."

In a further aspect of the present disclosure, if control information is available for transmission in the downlink, the control information is transmitted continuously in the downlink. For purposes of the present disclosure, this continuous transmission of the control information in the downlink may be referred to as "continuous transmission mode." Alternatively, where control information is not available for transmission in the downlink, a second portion (e.g., a second half) of the multiplexed packet is removed, allowing for the DRX or DTX to be intermittently inserted into the respective downlink and/or uplink transmission schedules between data packet transmissions.

As a result, in some scenarios, the network entity may transmit control information continuously in the downlink while the uplink is only transmitting control information intermittently. In these scenarios, the network entity will not receive inner-loop power control information in the uplink during DTX periods in the uplink transmission schedule. Thus, in an aspect, during these DTX periods, a network entity of the present disclosure may unitize a previously utilized transmission power level or may adjust the previously utilized transmission power level according to one or more transmission power control (TPC) commands that were transmitted by the UE before the DTX period.

Figure 1:
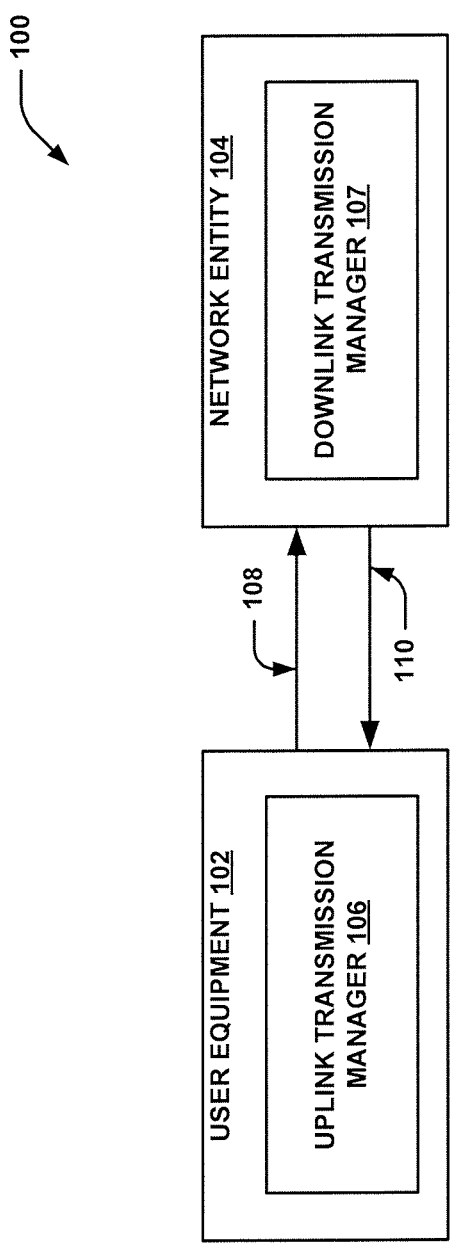
FIG. 1 is a block diagram illustrating an example wireless communications system according to the present disclosure.

FIG. 1 is a schematic diagram illustrating a system 100 for improved control information transmission and associated transmission power control, according to an example configuration. FIG. 1 includes an example network entity 104, which may communicate wirelessly with one or more UEs 102 over one or more wireless communication links. Furthermore, though a single network entity 104 is shown in FIG. 1, additional network entities may exist in system 100 and may communicate with UE 102 contemporaneously with network entity 104. In an aspect, the one or more wireless communication links over which the UE 102 and network entity 104 communicate may comprise any over-the-air (OTA) communication link, including, but not limited to, one or more communication links operating according to specifications promulgated by 3GPP and/or 3GPP2, which may include first generation, second generation (2G), 3G, 4G, etc. wireless network architectures. For example, in some aspects, the one or more communication links may include an uplink communication channel 108, which may carry data and/or control signaling transmitted by the UE 102 to the network entity 104. Additionally, the one or more communication links may include a downlink communication channel 110, which may carry data and/or control signaling transmitted by the network entity 104 to the UE 102.

In an aspect, UE 102 may be a mobile device, such as, but not limited to, a smartphone, cellular telephone, mobile phone, laptop computer, tablet computer, or other portable networked device. In addition, UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 may be small and light enough to be considered portable and may be configured to communicate wirelessly via an over-the-air communication link using one or more OTA communication protocols described herein. Furthermore, UE 102 may include an uplink transmission manager 106, which may be configured to perform uplink transmissions in an intermittent or continuous transmission mode and may be configured to perform inner-loop transmission power control processes described herein.

Additionally, network entity 104 of FIG. 1 may include one or more of any type of network module, such as an access point, a macro cell, including a base station (BS), node B, eNodeB (eNB), a relay, a peer-to-peer device, an authentication, authorization and accounting (AAA) server, a mobile switching center (MSC), a radio network controller (RNC), or a low-power access point, such as a picocell, femtocell, microcell, etc. Additionally, network entity 104 may communicate with one or more other network entities of wireless and/or core networks. In a further aspect, network entity 104 may include a downlink transmission manager 107, which may be configured to perform downlink transmissions in an intermittent or continuous transmission mode and may be configured to perform inner-loop transmission power control processes described herein.

Additionally, system 100 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet.

Additionally, such network(s), which may include one or more network entities 104, may comprise a Wideband Code Division Multiple Access (W-CDMA) system, and may communicate with one or more UEs 102 according to this standard. As those skilled in the art will readily appreciate, various aspects described throughout this disclosure may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UEs 102, network entity 104) may be coupled to a core network via one or more wired or wireless connections.

Figure 2:
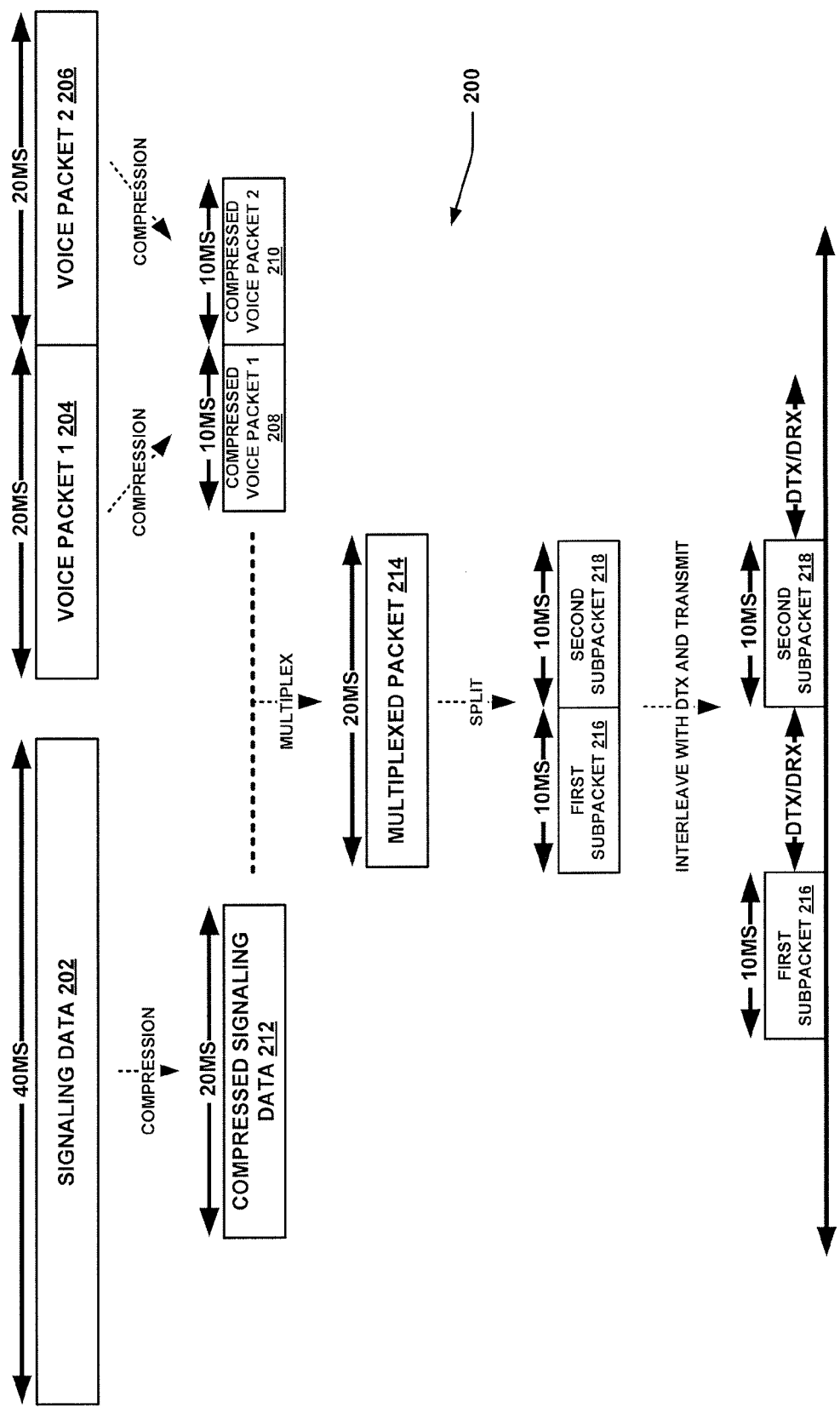
FIG. 2 is a block diagram illustrating an example process for uplink transmission according to the present disclosure.

Turning to FIG. 2, an example process 200 for transmitting multiplexed signaling and packet data is presented. The process 200 may be performed by a UE and/or network entity when the UE and/or network entity transmits data in the intermittent transmission mode of the present disclosure. Specifically, according to process 200, signaling data 202 and voice packets (e.g., voice packet 1 204 and voice packet 2 206) may be compressed, multiplexed, split, and interleaved with DTX or DRX intervals to form a transmission schedule that provides current savings for UEs and network entities employing the process 200. In an aspect, process 200 may be performed by uplink transmission manager 106 and/or downlink transmission manager 106 of FIG. 1.

In an aspect, signaling data 202 and two or more voice packets (e.g., voice packet 1 204 and voice packet 2 206) may be generated for transmission over an uplink or downlink channel. Signaling data 202 may include signaling radio bearer (SRB) data, or any other signaling data necessary for communication of voice packets. In addition, signaling data 202 may initially have an associated TTI, which, in some examples, may be twice the TTI of each voice packet. In process 200, for example, signaling data 202 may have a TTI of 40 ms, whereas voice packet 1 204 and voice packet 2 206 may have a TTI of 20 ms.

In an aspect of process 200, the TTI of voice packet 1 204 and voice packet 2 206 may be compressed to form compressed voice packet 1 208 and compressed voice packet 2 210. As shown in FIG. 2, these compressed voice packets may have a resulting TTI of half of voice packet 1 204 and voice packet 2 206. In other words, in a non-limiting example aspect, compressed voice packet 1 208 and compressed voice packet 210 may have an associated TTI of 10 ms. In a further aspect, signaling data 202 may likewise be compressed (e.g., by half) to form compressed signaling data 212. In other words, in a non-limiting example, where signaling data 202 has an associated TTI of 40 ms, the signaling data 202 may be compressed to 20 ms. In other examples that are not shown in FIG. 2, however, the TTI of signaling data 202 may be compressed to any other length, such as, but not limited to, 10 ms.

Once compressed signaling data 212 and compressed voice packets 208 and 210 are formed, they may be multiplexed to form a resulting multiplexed packet 214, which may have an associated TTI corresponding to the TTI of compressed signaling data 212 and twice the TTI of compressed voice packet 1 208 or compressed voice packet 2 210. For example, as shown in FIG. 2, where compressed signaling data 212 has an associated TTI of 20 ms and compressed voice packet 1 208 and compressed voice packet 2 210 have an associated TTI of 10 ms, multiplexed packet 214 may have an associated TTI of 20 ms.

Furthermore, once multiplexed packet 214 has been formed, it may be split into two or more subpackets. In an aspect, each of the subpackets may comprise a portion of the multiplexed waveform of multiplexed packet 214 and may have a TTI less than that of multiplexed packet 214. For example, as illustrated in FIG. 2, multiplexed packet 214 may be split into first subpacket 216 and second subpacket 218, which may each have an associated TTI of 10 ms, or half of the TTI associated with multiplexed packet 214 (i.e., 20 ms).

In a further aspect, once multiplexed packet 214 has been split into first subpacket 216 and second subpacket 218, these subpackets may be interleaved with two or more transmission intervals that each comprise a DTX period (in the uplink) or a DRX period (in the downlink). For purposes of the present disclosure, such "interleaving" may refer to alternating the transmission of (or reception of) a subpacket during a first interval and the absence of transmission (or reception) during a second subperiod corresponding to the DTX or DRX period.

Figure 3:
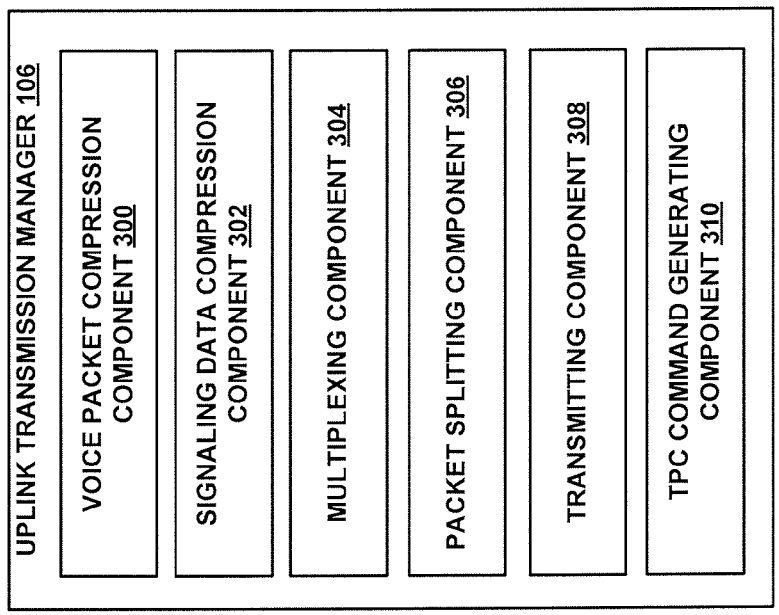
FIG. 3 is a block diagram illustrating an example downlink transmission manager according to an example apparatus of the present disclosure.

In FIG. 3, an example uplink transmission manager 106 (of FIG. 1, for example) is presented as comprising a plurality of individual components for carrying out the one or more methods or processes described herein (e.g., process 200 of FIG. 2). In some examples, uplink transmission manager 106 may be configured to compress voice packets and control data, multiplex the compressed waveforms into a multiplexed packet, split the multiplexed packet into subpackets, and interleave the subpackets with one or more DTX intervals.

In an aspect, uplink transmission manager 106 may include a voice packet compression component 300, which may be configured to compress one or more voice packets from a first voice packet TTI to a second voice packet TTI. For example, voice packet compression component 300 may be configured to compress two consecutive voice packets having a first voice packet TTI into two compressed voice packets having a second voice packet TTI shorter than the first voice packet TTI. In an aspect, the compression may be executed via traditional compression, interleaving, and other physical layer procedures based on the second voice packet TTI. In some examples, the compression performed by voice packet compression component 300 may compress the one or more voice packets such that the resulting TTI of the compressed voice packets is half of the TTI of the one or more pre-compression voice packets. For instance, in an aspect, voice packet compression component 300 may be configured to compress one or more voice packets having a TTI of 20 ms to one or more voice packets having a 10 ms TTI.

In addition, uplink transmission manager 106 may include a signaling data compression component 302, which may be configured to compress signaling data corresponding to a first dedicated control channel (DCCH) TTI into compressed signaling data having a second DCCH TTI. In an aspect, as a result of the compression performed by the signaling data compression component 302, the second DCCH TTI of the compressed signaling data may be half of the first DCCH TTI of the pre-compression signaling data TTI.

Furthermore, uplink transmission manager 106 may include a multiplexing component 304, which may be configured to multiplex the one or more compressed voice packets and the compressed signaling data produced by voice packet compression component 300 and signaling data compression component 302, respectively. For example, multiplexing component 304 may be configured to multiplex the two compressed voice packets and the compressed signaling data to form a multiplexed packet. In an aspect, the multiplexed packet produced by multiplexing component 304 may have an associated TTI equal to the second DCCH TTI of the compressed signaling data, which may be equivalent to twice the TTI of the individual compressed voice packets.

In a further aspect, uplink transmission manager 106 may include a packet splitting component 306, which may be configured to split the multiplexed packet produced by multiplexing component 304 into a plurality of subpackets. For instance, packet splitting component 306 may be configured to split the multiplexed packet into a first subpacket and a second subpacket. In some examples, each of the first subpacket and second subpacket may have a TTI of half of the multiplexed packet produced by multiplexing component 304.

Furthermore, in an aspect, uplink transmission manager 106 may include a transmitting component 308, which may be configured to intermittently transmit the one or more subpackets produced by packet splitting component to a network entity via an uplink communication channel. For instance, in some examples, the transmitting component may be configured to transmit the first subpacket during a first subpacket interval having a subpacket TTI. Thereafter, the transmitting component 308 may pause transmission for a time interval corresponding to the subpacket TTI. In an aspect, this time interval may correspond to a DTX period in the uplink. Following this transmission pause during the time interval, the UE may be configured to transmit the second subpacket during a second subpacket interval having the subpacket TTI. Again, following this transmission of the second subpacket, the transmitting component 308 may again pause transmission for a time interval having the subpacket TTI after transmitting the second subpacket. In an aspect, this time interval may correspond to a further DTX period between subpacket transmissions. As such, transmitting component 308 may alternate between transmitting subpackets and pausing all transmission to form DTX periods between subpacket transmissions.

In an additional aspect, uplink transmission manager 106 may include a transmission power control (TPC) command generating component 310, which may be configured to generate one or more TPC commands that may be transmitted to a network entity by transmitting component 308. In an aspect, TPC command generating component 310 may be configured to obtain a received power level of one or more transmissions (e.g., pilot signal or packet data transmissions)

from a network entity. Based on the received power level, the TPC command generating component may compare the received power level to a target received power level or target received power level range to determine whether the received power level should be increased or decreased. Where the TPC command generating component 310 determines that the received power level should be increased or decreased, a TPC command may be generated to instruct the network entity that its transmission power is to be increased or decreased.

Through exemplary components 300, 302, 304, 306, 308, and 310 are presented in reference to uplink transmission manager 106, they are not exclusive. Instead, uplink transmission manager 106 may include additional or alternative components configured to perform aspects of the present disclosure and the claims recited below.

Figure 4:
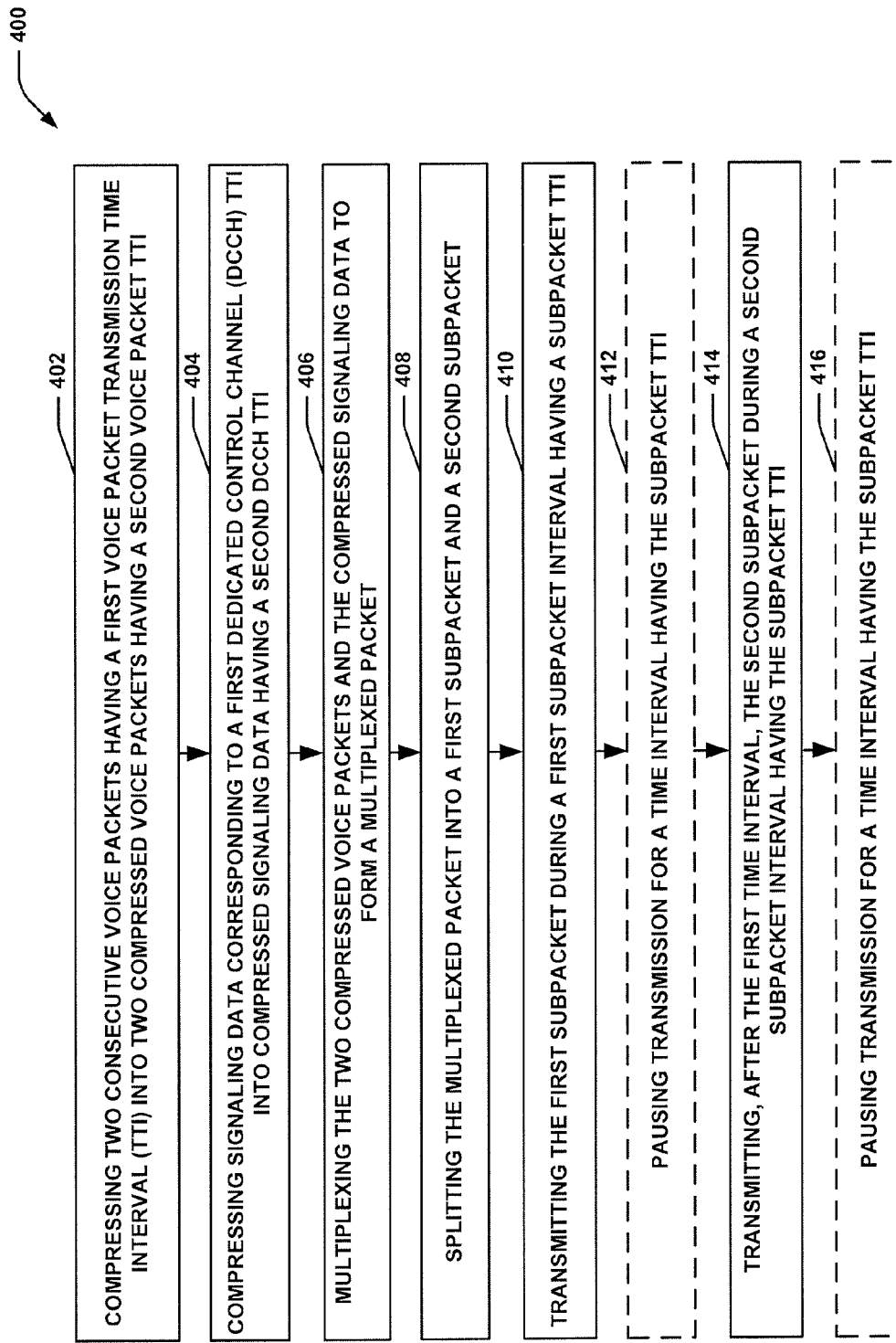
FIG. 4 is a flow diagram comprising a plurality of functional blocks representing an example methodology of the present disclosure.

FIG. 4 presents an exemplary methodology 400 for uplink mobile communication comprising a non-limiting set of steps represented as blocks that may be performed by one or more apparatuses described herein (e.g. user equipment 102 of FIG. 1, and/or one or more components of UE 102, such uplink transmission manager 106 and/or its subcomponents presented in FIG. 2.). In an aspect, methodology 400 comprises a method of interleaving one or more periods of uplink transmission with one or more DTX periods, or transmitting in an "intermittent transmission mode" in the uplink.

Methodology 400 may include, at block 402, compressing two consecutive voice packets having a first voice packet TTI into two compressed voice packets having a second voice packet TTI. In some examples, the voice packets may be non-consecutive and/or may comprise more than two voice packets. In addition, in some examples, the first voice packet TTI may be 20 ms and the second voice packet TTI of the compressed voice packets may be 10 ms, although these represent non-limiting examples. In an aspect, block 402 may be performed by voice packet compression component 300 of FIG. 3. In addition, at block 404, methodology 400 may include compressing signaling data corresponding to a first DCCH TTI into compressed signaling data having a second DCCH TTI. In some examples, the first DCCH TTI may be In an aspect, block 404 may be performed by signaling data compression component 302 of FIG. 3

Furthermore, in an aspect, methodology 400 may include, at block 406, multiplexing the two compressed voice packets and the compressed signaling data to form a multiplexed packet. In some examples, block 406 may be performed by multiplexing component 304 of FIG. 3. In an additional aspect, methodology 400 may include splitting the multiplexed packet into a first subpacket and a second subpacket at block 408. In some examples, splitting the multiplexed packet may result in each of the first subpacket and the second subpacket having a subpacket TTI corresponding to the second voice packet TTI. For example, where the second voice packet TTI is 10 ms, each of the first subpacket and the second subpacket may have a corresponding TTI of 10 ms, or half of the 20 ms TTI of the multiplexed packet. In some examples, block 408 may be performed by packet splitting component 306 of FIG. 3.

Additionally, methodology 400 may include, at block 410, transmitting the first subpacket during a first subpacket interval having a subpacket TTI. In an aspect, the subpacket TTI may correspond to the TTI of each subpacket resulting from splitting the multiplexed packet at block 408. In some examples, this subpacket TTI is 10 ms, though this exemplary value is non-limiting.

Furthermore, to interleave the transmission of the one or more subpackets with one or more DTX periods, methodology 400 may optionally include (as indicated by the dashed lines of block 412) pausing transmission for a time interval corresponding to the subpacket TTI at block 412. In an aspect, the time interval over which the transmission is paused at block 412 may correspond to a DTX period in the uplink transmission schedule. After pausing transmission for the time period at block 412, the second subpacket may be transmitted. Thus, at block 414, methodology 400 may include transmitting the second subpacket during a second subpacket interval subsequent to the first subpacket interval. In an aspect, the second subpacket interval may have the subpacket TTI that corresponds to the subpacket TTI of the first subpacket interval. In addition, methodology 400 may optionally include (as indicated by the dashed lines of block 416) pausing transmission for a time interval corresponding to the subpacket TTI at block 416. Like the time interval of block 412, the time interval over which the transmission is paused at block 416 may correspond to a DTX period in the uplink transmission schedule. In an aspect, blocks 410, 412, 414, and 416 may be performed by transmitting component 308 of FIG. 3.

In a further aspect of the present disclosure, power control procedures are presented to compensate for the lack of uplink and downlink TPC command transmission during the DTX and DRX periods inserted into the uplink and downlink transmission schedules of the UE and network entity, respectively, when operating in intermittent transmission mode. For example, FIGS. 5A and 5B each present transmission schedule diagrams illustrating inner-loop power control procedures for uplink and downlink transmissions when both the UE and the network entity are operating in intermittent transmission mode (e.g., when DTX or DRX periods are inserted into the transmission schedule intermittently), resulting in discontinuous wireless signal transmission.

Referring to FIG. 5A, a downlink transmission schedule 556 corresponds to that of a network entity transmitting during a plurality of downlink slots in a downlink communication channel. Likewise, an uplink transmission schedule 557 corresponds to that of a UE transmitting during a plurality of uplink slots in an uplink communication channel. In an aspect of the present disclosure, the transmission power of a slot used for the transmission of signals in the uplink and downlink in the slot may be derived from the power at the end of the last slot and may be modified by one or more TPC commands. For example, the UE or network entity may simply use the same transmission power it used in a previous slot or may modify the transmission power of the previous slot by applying a TPC command on top of that previous transmission power. Example implementations of these transmission power control alternatives contemplated by the present disclosure are presented in FIGS. 5A and 5B

The TPC commands transmitted in the uplink (e.g., TPCs 523, 526, 530, and 533) and downlink (e.g., TPCs 505, 508, 512, and 515) are generated by the UE and network entity, respectively, based on the received power level of previously received signals (e.g., data and/or pilot signals) and/or a quality metric (e.g., a signal-to-noise ratio (SNR)) associated with these previously received signals. For example, in DL slot 2 501 of FIG. 5A, the TPC command 508 may be generated by the network entity based on a power level or quality metric (e.g., signal-to-interference ratio (SIR)) of data 518 transmitted by the UE in uplink slot 0 534, as indicated by line 539. For purposes of FIGS. 5A and 5B, the dot-dot-dash lines (e.g., lines 539, 541, 542, 557, 559 and 563) represent the transmission of signals upon which a TPC command value is based. Likewise, for purposes of FIGS. 5A and 5B, the dotted lines represent the transmission of TPC commands that are initially applied at the point on the transmission schedule 556 or 557 to which the dotted line arrow points. For example, as illustrated in FIG. 5A, TPC command 508 may be transmitted by the network entity in the downlink during DL slot 2 501 and may be received by the UE and applied to the transmission power associated with the transmission of data 524 during UL slot 2 536.

In an additional aspect of the present disclosure, the data (e.g., data 506, 509, 518, 521, and the like) of FIGS. 5A, 5B, 6A, and/or 6B may comprise packet data. In some examples, this packet data may include voice packet data, audio packet data, video packet data, or any other data transmitted between a network entity and a UE via one or more dedicated communication channels. For instance, the data of FIGS. 5A, 5B, 6A, and/or 6B may include first subpacket 216 or second subpacket 218 of FIG. 2 when the UE and/or the network entity are transmitting in intermittent transmission mode. Furthermore, as indicated in downlink transmission schedule 556 of FIGS. 5A and 5B and downlink transmission schedule 665 of FIGS. 6A and 6B, each downlink slot may contain both a TPC command and a pilot signal portions. In alternative downlink transmission schedule examples not presently shown, however, the any downlink transmission schedule of the present disclosure may optionally not include a dedicated pilot signal portion. Instead, in such examples, each slot of the downlink transmission schedule may include a TPC command (e.g., which may be located at the end of each slot) that serves as a pilot signal for the slot.

Furthermore, in some examples, in the uplink transmission schedules 557 and 667 of FIGS. 5A, 5B, 6A, and 6B, the "data" portions of the uplink transmission schedule may be a pilot signal portion rather than "data." Moreover, in the downlink transmission schedules 556 and 665 of FIGS. 5A, 5B, 6A, and 6B, though three discrete portions of each DL slot are shown (TPC, data, and pilot), other portions of each DL slot may exist. For example, another data portion pay precede each TPC portion, though not shown explicitly in FIGS. 5A, 5B, 6A, and 6B. In addition, In an aspect of the present disclosure, the network entity may be scheduled to transmit a TPC command directly after a DRX period. For example, in FIG. 5A, the network entity may be scheduled to transmit TPC command 512 following DRX period 511. However, as no signals are received in the uplink during the DRX period 511, the network entity cannot base the contents of the TPC command 512 on such non-existent uplink signals. As such, the network entity may instead utilize the received power level or quality metric (e.g., SNR) of uplink data to generate the TPC command following the DRX period 511. For example, consider TPC command 512 of FIG. 5A. During DRX period 511, no uplink communications are received from the UE, as the UE has paused transmission of all signals during the DTX period 527, including signals upon which TPC 512 may be based. In an aspect, the DRX interval 511 may comprise more than one DL slot or one DL slot. Likewise, the DTX interval 527 may comprise more than one UL slot or one UL slot, depending on the scenario.

As a result, in an aspect of the present disclosure, the network entity may generate TPC commands based on signals received by the network entity prior to the DRX period 511. For example, data 521 of UL slot 1 535 and data 524 of UL slot 2 536 may be received by the network entity prior to DTX 527 (and during or before DRX 511). In an aspect, because no TPC commands are transmitted during DTX 527 or received during DRX 511 when both the uplink and downlink are operating in intermittent transmission mode, as indicated by lines 541 and 542, the network entity may utilize one or more of data 521 or data 524 to determine the contents of TPC command 512.

Furthermore, once transmitted, the TPC command 512 may be received by the UE during DTX period 527. In an aspect, as indicated by dotted line 543, the UE may apply the TPC command 512 for uplink transmission of data 528 immediately following DTX period 527. Alternatively, in some examples, rather than apply the TPC command 512 directly following the DTX period 527, the UE may instead ignore the TPC command 512 and continue to apply the transmission power utilized during UL slot 2 536.

Furthermore, in some inner-loop power control examples, a UE or a network entity may be configured to apply a received TPC command if the TPC command was generated based on a signal quality metric (e.g., SNR) computed while a dedicated communication channel was not in a DTX interval. In these examples, the UE or network entity may apply the TPC command to a previous transmission power that preceded the DTX interval.

For example, consider TPC 512 of FIG. 5A, which may be transmitted by the network entity during DTX interval 527. As indicated by lines 541 and 542, TPC command 512 may be generated based on a quality metric of one or both of received data signals 521 and 524. In an aspect, because data signals 521 and 524 are received prior to DTX interval 527, the quality metrics associated with these received data signals may be computed by the network entity before DTX interval 527. Once these quality metrics are generated, the network entity may generate TPC command 512 and transmit TPC command 512 to the UE during DTX interval 527, during which the UE has paused all uplink transmission. In an aspect, as indicated by line 543, the UE may apply TPC command 512 to a most recent transmission power (e.g., the transmission power immediately before DTX interval 527) when the UE resumes uplink transmission of data 528 after DTX interval 527. Additionally, although the above-recited example of inner-loop power control may be performed by a UE for uplink transmissions, the same process may be implemented by a network entity for downlink transmissions. Thus, according to the present disclosure, a UE or network entity may be configured to apply a TPC command received during a pause in transmission (e.g., a DTX interval) when the quality metric computation upon which the TPC command is based was computed before the pause in transmission (i.e., outside of a DTX interval). Such an example method is described further in FIG. 8A, below.

Turning to FIG. 5B, the downlink transmission schedule 556 and uplink transmission schedule 557 of a network entity and UE, respectively, of the present disclosure are again illustrated. As shown in FIG. 5B, the contents of TPC commands (e.g. TPC commands 523, 526, and 530) may be generated by a UE based on one or more pilot signals (e.g., pilot signals 507, 510, and 514) transmitted by the network entity and received at the UE.

In an aspect of the present disclosure, the last TPC command transmitted by the UE before a DTX period and received by the network entity during a DTX period may be either applied by the network entity immediately following the DRX period, at a next pilot signal transmission after the DRX period, or, in some examples, the TPC command may be ignored by the network entity. For example, referring to line 560, the network entity may apply the TPC command 526 to the transmission power directly following DRX period 511. In an alternative aspect, instead of applying the TPC command 526 directly following the DRX period 511, referring to line 561, the network entity may apply the TPC command 526 starting at the transmission of the pilot signal 514 in DL slot 4 503. In a further alternative aspect, referring to line 562, the network entity may ignore TPC command 526 following DTX period 511. In other words, where the network entity ignores the TPC command 526, the network entity may continue to apply a transmission power level utilized before DTX period 511 even after receiving TPC command 526.

In a further aspect of the present disclosure, in some instances, a network entity may determine that no signaling information (or DCCH information) exists for transmission in the downlink during a slot. In such a scenario, the network entity may generate a downlink waveform and may simply delete alternating time periods (e.g., alternating 10 ms time periods) of the waveform to form DRX openings in the waveform. Alternatively, in another example, where the network entity determines that signaling information is available for transmission in the downlink during a slot, the network entity may not utilize intermittent transmission mode in the downlink for the slot. Instead, the network entity may continuously transmit the signaling information in the downlink regardless of whether the UE is transmitting in intermittent transmission mode in the uplink.

Such a scenario implementing this continuous transmission mode in the downlink is illustrated in FIGS. 6A and 6B. Like FIGS. 5A and 5B, FIGS. 6A and 6B illustrate a downlink transmission schedule 665 of a network entity and an uplink transmission schedule 667 of a UE of the present disclosure. Like FIGS. 5A and 5B, the TPC commands transmitted in the uplink (e.g., TPCs 620 and 623) and downlink (e.g., TPCs 605, 608, 612, and 615) are generated by the UE and network entity, respectively, based on the received power level of previously received signals (e.g., data and/or pilot signals). For example, in DL slot 2 601 of FIG. 6A, the TPC command 608 may be generated by the network entity based on the power level of data 618 transmitted by the UE in uplink slot 0 634, as indicated by line 640. Again, as is FIGS. 5A and 5B, for purposes of FIGS. 6A and 6B, the dot-dot-dash lines represent the transmission of signals upon which a TPC command value is based. Likewise, for purposes of FIGS. 6A and 6B, the dotted lines represent the transmission of TPC commands that are initially applied at the point on the transmission schedule 665 or 667 to which the dotted line arrow points. For example, as illustrated in FIG. 6A, TPC command 608 may be transmitted by the network entity in the downlink during DL slot 2 601 and may be received by the UE and applied to the transmission power associated with the transmission of data 624 during UL slot 2 636.

Turning to FIG. 6A, unlike FIG. 5A, the network entity transmits signaling data continuously, as indicated in downlink transmission schedule 665. Thus, rather than inserting a DRX period into the downlink transmission schedule 665, the network entity transmits signals during DL slot 3. In some aspects, these signals may include one or more TPC commands (e.g., TPC command 658), downlink data (e.g., data 659), and/or one or more pilot bits (e.g., pilot 660). However, because the UE in FIGS. 6A and 6B does not transmit signals in the uplink during DTX period 627, the network entity may disable inner-loop power control (ILPC) during DL slot 3, as any signals upon which power control may be based are not received by the network entity during this DTX period 627. Therefore, in an aspect, the TPC command 658 generated and transmitted during the interval during which ILPC is disabled (interval 602) may be based on data transmitted by the UE in slots preceding the DTX period 627. For example, as indicated by lines 642 and 643 of FIG. 6A, the TPC command 658 may be based on a received power level of data 621 and/or data 624, which are transmitted by the UE in previous UL slot 1 635 and previous UL slot 2 636, respectively. In an aspect, the interval 602 during which ILPC is disabled may comprise more than one DL slot or one DL slot. Likewise, the DTX interval 627 may comprise more than one UL slot or one UL slot, depending on the scenario.

In a further aspect of the disclosure, because the UE is transmitting in intermittent transmission mode and has therefore inserted DTX period 627 into its uplink transmission schedule 667, the UE may either utilize the TPC command(s) received from the network entity during DTX period 627 following the DTX period 627 or may simply ignore these received TPC commands. For example, TPC command 658 may be transmitted by the network entity and received by the UE during DTX period 627. As indicated by line 645 of FIG. 6A, the UE may choose to apply the contents of the TPC command 658 once the UE resumes transmission in the uplink at UL slot 4 637. In other words, in one option, the UE may modify a previous transmission power (e.g., a transmission power level utilized during UL slot 2 636) based on TPC command 658 for transmission of data 628 in the uplink. In an alternative option, in some examples, as indicated by line 664 in FIG. 6A, the UE may simply ignore TPC command 658 and may instead utilize the previous transmission power (e.g., a transmission power level utilized during UL slot 2 636) when it resumes uplink transmission in UL slot 4 637.

Furthermore, as illustrated in FIG. 6B, as the UE does not transmit TPC commands during DTX period 627, the network entity may optionally utilize a TPC command transmitted by the UE prior to DTX period 627 for transmissions during interval 602 or may ignore this prior TPC command. For example, TPC command 626 may be transmitted by the UE during UL slot 2 636 and may be received by the network entity during interval 602. In an aspect, as indicated by line 674, the network entity may implement the contents of the TPC command 626 for transmission of data 659 during interval 602. Alternatively, as indicated by line 675, the UE may maintain a previously utilized transmission power level (e.g., a transmission power level utilized during DL slot 601) for the remainder of DL slot 3 after receiving TPC command 628. In this case, the UE may instead modify this previously utilized transmission power level based on the contents of the TPC command 626 beginning at DL slot 4 603.

In another alternative, as indicated by line 676, in some examples, the network entity may receive TPC command 626 during interval 602, but may simply ignore the contents of the TPC command 626. In this alternative implementation, the network entity may utilize a previously utilized transmission power level until a subsequent TPC command is received from the UE after DTX period 627. In other words, in an aspect, the network entity may utilize a power level used in DL slot 2 601 for interval 602, DL slot 4 603, and potentially a portion of DL slot 5 604 until, as indicated by line 678, the network entity receives TPC command 630 transmitted by UE during UL slot 4 637 in the uplink.

Figure 7:
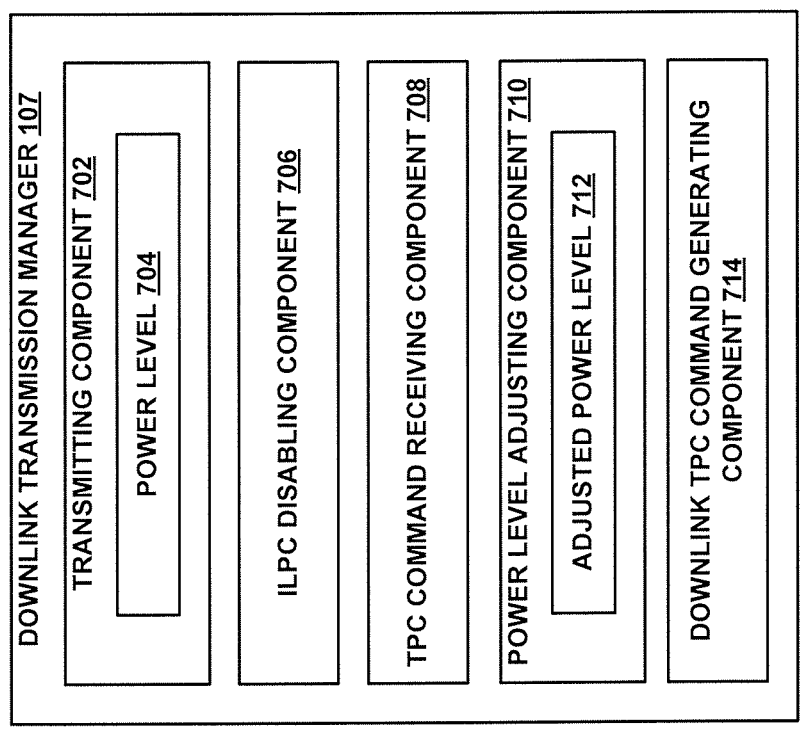
FIG. 7 is a block diagram illustrating an example downlink transmission manager according to an example apparatus of the present disclosure.
Figure 8A:
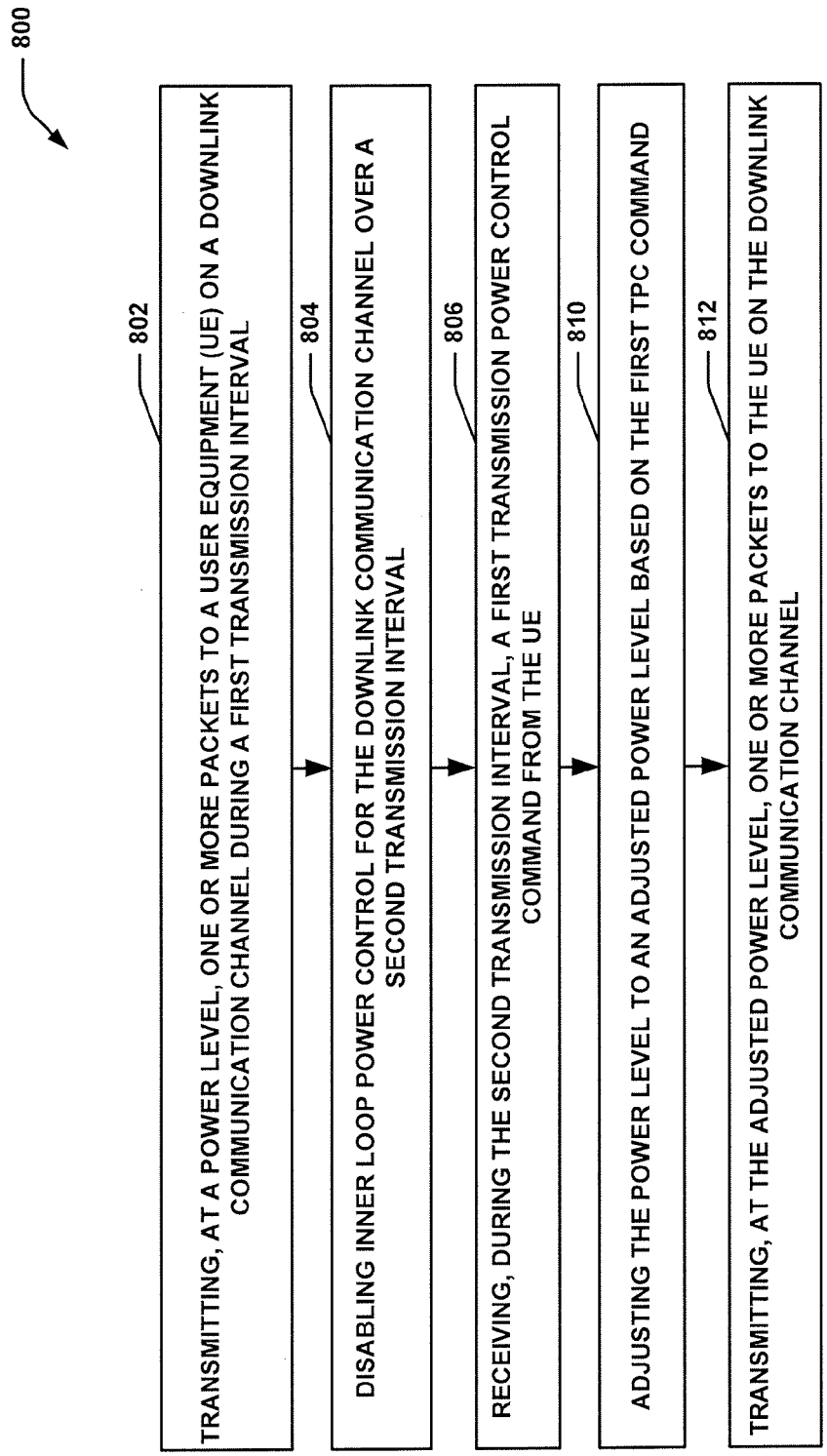
FIG. 8A is a flow diagram comprising a plurality of functional blocks representing an example methodology for inner-loop power control according to the present disclosure.
Figure 8B:
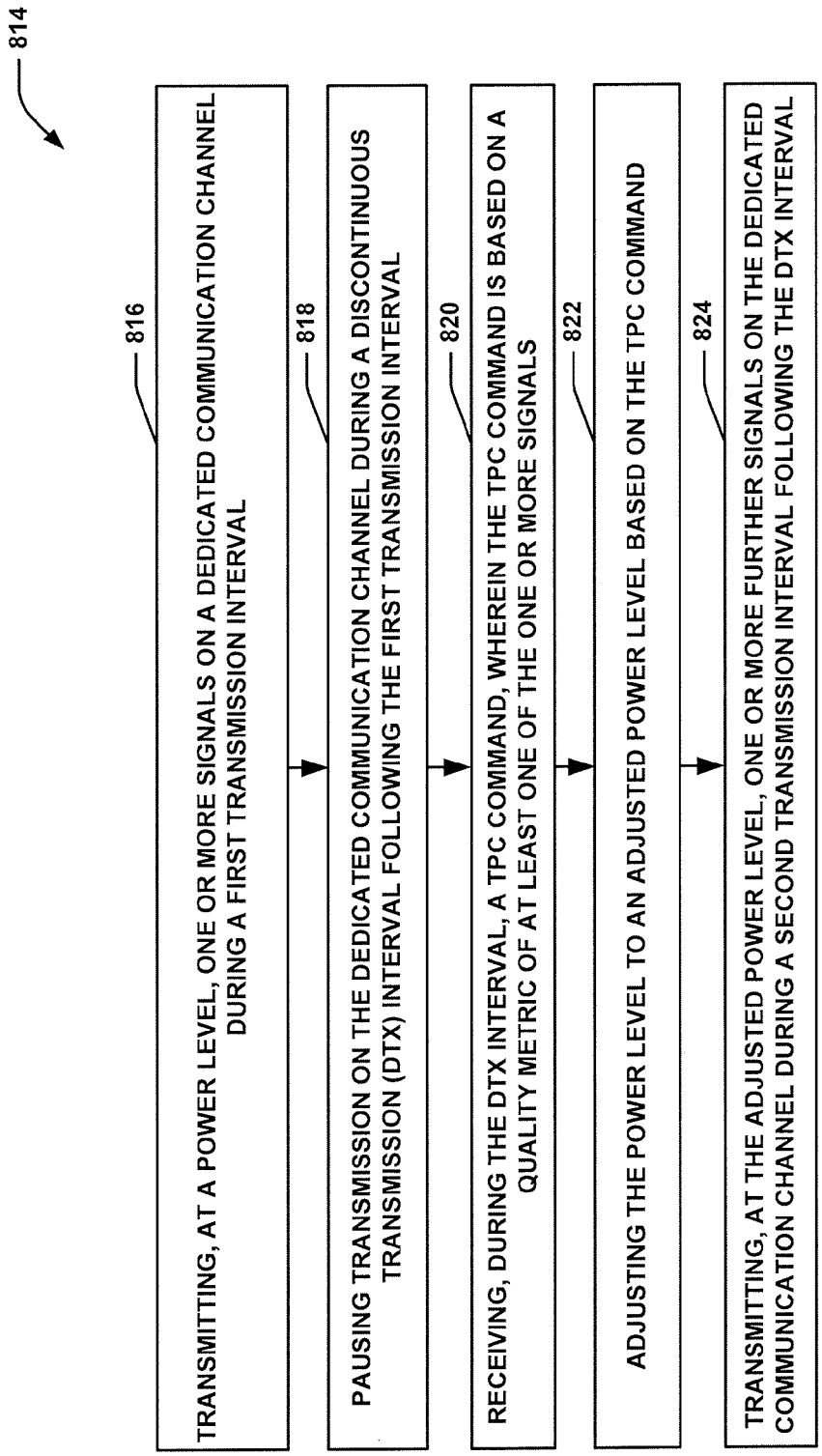
FIG. 8B is a flow diagram comprising a plurality of functional blocks representing a further example methodology for inner-loop power control according to the present disclosure.

In FIG. 7, an example downlink transmission manager 107 (of FIG. 1, for example) is presented as comprising a plurality of individual components for carrying out the one or more methods or processes described herein (e.g., process 800 of FIG. 8A, process 814 of FIG. 8B, and/or power control processes described in reference to FIGS. 5A, 5B, 6A, and/or 6B). In some examples, downlink transmission manager 106 may be configured to manage transmission power control of transmissions in the downlink where TPC commands are temporarily unavailable in the uplink.

In an aspect, downlink transmission manager 106 may include a transmitting component 702, which may be configured to transmit one or more packets to a UE on a downlink communication channel. For such transmissions, the transmitting component 702 may maintain a power level 704 for such transmissions. In an aspect, the power level 704 may be adjusted intermittently based on one or more TPC commands received from a UE in the uplink. In other words, transmitting component 702 may be further configured to transmit one or more further packets to the UE after receiving the one or more TPC commands from the UE.

In an additional aspect, downlink transmission manager 107 may include an inner-loop power control (ILPC) disabling component 706, which may be configured to disable inner-loop power control for UE during a transmission interval. For example, the ILPC disabling component 706 may be configured to generate and transmit a TPC command during the transmission interval (even though the TPC command may be ignored by the UE), halt transmission of TPC commands in the downlink over the transmission interval, and/or generate the TPC command but wait to transmit the TPC command until completion of the transmission interval.

Furthermore, the downlink transmission manager 107 may include a TPC command receiving component 708, which may be configured to receive one or more TPC commands from a UE via an uplink communication channel. In an aspect, TPC command receiving component may comprise a receiver, transceiver, or any other signal receiving component and its related circuitry. In addition, downlink transmission manager 107 may include a power level adjusting component 710, which may be configured to adjust the power level 704 to an adjusted power level 712 based on a received TPC command.

In an additional aspect, downlink transmission manager 107 may include a downlink TPC command generating component 714, which may be configured to generate one or more TPC commands that may be transmitted to a UE to control the transmission power of uplink communications of the UE. In an aspect, downlink TPC command generating component 714 may be configured to generate one or more downlink TPC commands based on one or more uplink transmissions received from the UE.

FIGS. 8A and 8B present exemplary methodologies 800 and 814 for mobile communication and inner-loop power control in a wireless network environment. For instance, FIG. 8A presents an exemplary methodology 800 for mobile communication at a network entity (e.g., network entity 104 of FIG. 1) comprising a non-limiting set of steps represented as blocks that may be performed by one or more apparatuses or component described herein (e.g. downlink transmission manager 107 of FIGS. 1 and 7). In an aspect, methodology 800 may include, at block 802, transmitting, at a power level, one or more packets to a UE on a downlink communication channel during a first transmission interval.

Furthermore, at block 804, methodology 800 may include disabling inner-loop power control for the downlink communication channel over a second transmission interval. In some examples, the second transmission interval may coincide, at least partially, with a period in an uplink communication channel during which the UE halts transmission. As such, disabling the inner-loop power control of the downlink communication channel at block 804 may include halting transmission of TPC commands on the downlink communication channel for the second transmission interval. In other examples, however, disabling the inner-loop power control may not necessarily imply that that the TPC command transmissions are halted. Instead, TPC commands may be transmitted in the downlink but may simply be ignored by the UE. Alternatively, disabling inner-loop power control for the downlink communication channel may include generating a TPC command based on previous received power levels associated with received uplink data but waiting to transmit the generated TPC command until the second transmission interval is complete.

In an additional aspect, methodology 800 may include, at block 806, receiving, during the second transmission interval, a first TPC command from the UE. In an aspect, block 808 may be performed by TPC command receiving component 708 of FIG. 7. In an aspect, the received TPC command may include instructions to increase or decrease a previously utilized transmission power level associated with downlink transmissions at the network entity. Accordingly, at block 810, methodology 800 may include adjusting the power level to an adjusted power level based on the first TPC command. In some examples, block 810 may be performed by power level adjusting component 710 of FIG. 7.

In an additional aspect, methodology 800 may include, at block 812, transmitting, at the adjusted power level, one or more packets to the UE on the downlink communication channel. In some examples, transmitting the one or more packets to the UE at the adjusted power level may include transmitting the one or more packets during a third transmission interval following the second transmission interval. Alternatively, the TPC command may be implemented during the second transmission interval. As such, in some examples, transmitting the one or more packets to the UE at the adjusted power level comprises transmitting the one or more packets during the second transmission interval. In an aspect, block 812 may be performed by transmitting component 702 of FIG. 7.

Furthermore, though not explicitly shown in FIG. 8, methodology 800 may include additional aspects. For example, methodology 800 may include receiving, during the first transmission interval, a second TPC command and adjusting the power level to a second adjusted power level based on the second TPC command. Additionally, methodology 800 may include transmitting the one or more packets at the second adjusted power level.

Moreover, methodology 800 may include the generation and transmission of TPC commands in the downlink for application by a UE for its uplink transmissions. For example, methodology 800 may further include receiving one or more uplink transmissions from a UE over an uplink communication channel. In some examples, these uplink transmissions may include uplink voice data or other uplink data. Additionally, methodology 800 may include generating a downlink TPC command based on at least one of the one or more uplink transmissions and transmitting the downlink TPC command to the UE during the second transmission interval.

Turning to FIG. 8B, an additional methodology 814 for mobile communication and inner-loop power control in a wireless network environment is presented. In an aspect, methodology 814 may include techniques for inner-loop power control for discontinuous wireless signal transmission by a UE (for uplink signal transmission) or a network entity (for downlink signal transmission). For example, when methodology 814 is employed by a UE or network entity, the UE or network entity may only apply TPC commands that are based on signal quality metrics calculated outside of a DTX interval. In other words, if a TPC command is received, but that TPC command is based on an SNR estimate computed during a DTX interval, the received TPC command may be ignored.

Methodology 814 may include, at block 816, transmitting, at a power level, one or more signals on a dedicated communication channel during a first transmission interval. In an aspect, block 816 may be performed by transmitting component 308 of FIG. 3 or transmitting component 702 of FIG. 7. In some examples, the dedicated communication channel may include a DCCH or a DPDCH, but may be any dedicated communication channel between a UE and a network entity. In addition, the first transmission interval may be an interval in a discontinuous transmission schedule of a UE or a network entity and may precede a DTX interval or any interval wherein a transmitter or receiver of the UE or network entity is inactive.

In addition, methodology 814 may include, at block 818, pausing transmission on the dedicated communication channel during a DTX interval following the first transmission interval. In an aspect, block 816 may be performed by transmitting component 308 of FIG. 3 or transmitting component 702 of FIG. 7. Moreover, methodology 814 may include, at block 820, receiving a TPC command during the DTX interval. In addition, in an aspect of the present disclosure, the TPC command received during the DTX interval may be based on a quality metric (e.g., SNR) of at least one of the one or more signals that were transmitted during the first transmission interval. In an aspect, block 820 may be performed by, for example, transceiver 910 of FIG. 9, below.

Furthermore, methodology 814 may include adjusting the power level to an adjusted power level based on the TPC command at block 822. In some examples, the adjusted power level may comprise a transmission power level that is greater than or less than a previously applied transmission interval (e.g., a last-applied transmission power level before a DTX interval). In an aspect, block 822 may be performed by power level adjusting component 710 of FIG. 7. In an additional aspect, methodology 814 may include at block 824, transmitting, at the adjusted power level, one or more further signals on the dedicated communication channel during a second transmission interval following the DTX interval. In an aspect, block 824 may be performed by transmitting component 308 of FIG. 3 or transmitting component 702 of FIG. 7.

Figure 9:
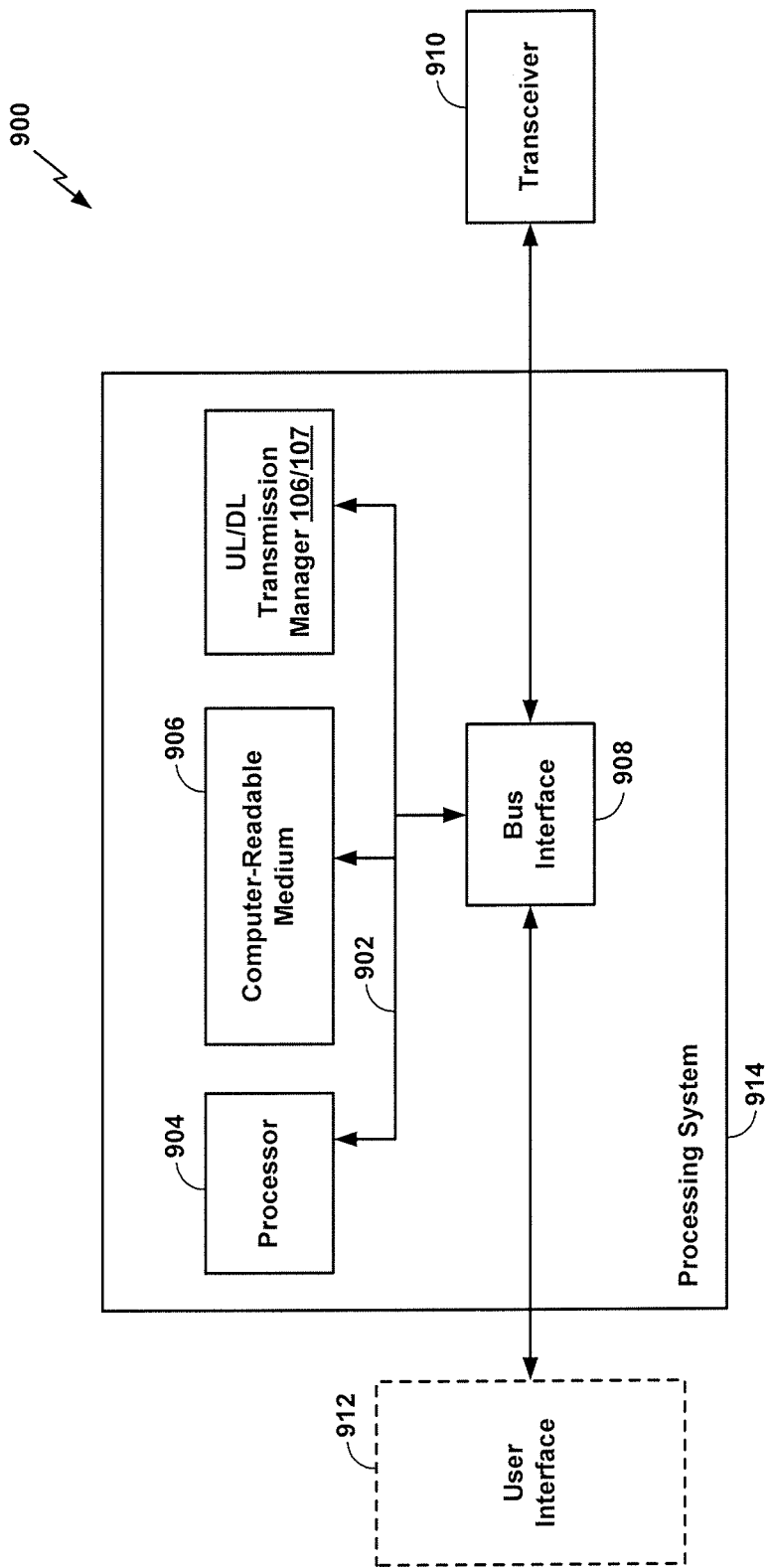
FIG. 9 is a diagram illustrating an example of a hardware implementation for an apparatus employing a processing system.

FIG. 9 is a conceptual diagram illustrating an example of a hardware implementation for an apparatus 900 employing a processing system 914. In some examples, the processing system 914 may comprise a UE (e.g., UE 102 of FIG. 1) or a component of a UE or a network entity (e.g., network entity 104) or a component thereof. In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors, represented generally by the processor 904, computer-readable media, represented generally by the computer-readable medium 906, and an uplink transmission manager 106 (see FIGS. 1 and 3) or downlink transmission manager 107 (see FIGS. 1 and 7), which may be configured to carry out one or more methods or procedures described herein. In an aspect, the uplink transmission manager 106 or downlink communication manager 107 and the components therein may comprise hardware, software, or a combination of hardware and software that may be configured to perform the functions, methodologies (e.g., methodology 400 of FIG. 4 or 800 of FIG. 8), or methods presented in the present disclosure.

The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium. Depending upon the nature of the apparatus, a user interface 912 (e.g., keypad, display, speaker, microphone, joystick) may also be provided.

The processor 904 is responsible for managing the bus 902 and general processing, including the execution of software stored on the computer-readable medium 906. The software, when executed by the processor 904, causes the processing system 914 to perform the various functions described infra for any particular apparatus. The computer-readable medium 906 may also be used for storing data that is manipulated by the processor 904 when executing software. In some aspects, at least a portion of the functions, methodologies, or methods associated with the uplink transmission manager 106 or the downlink transmission manager 107 may be performed or implemented by the processor 904 and/or the computer-readable medium 906.

Figure 10:
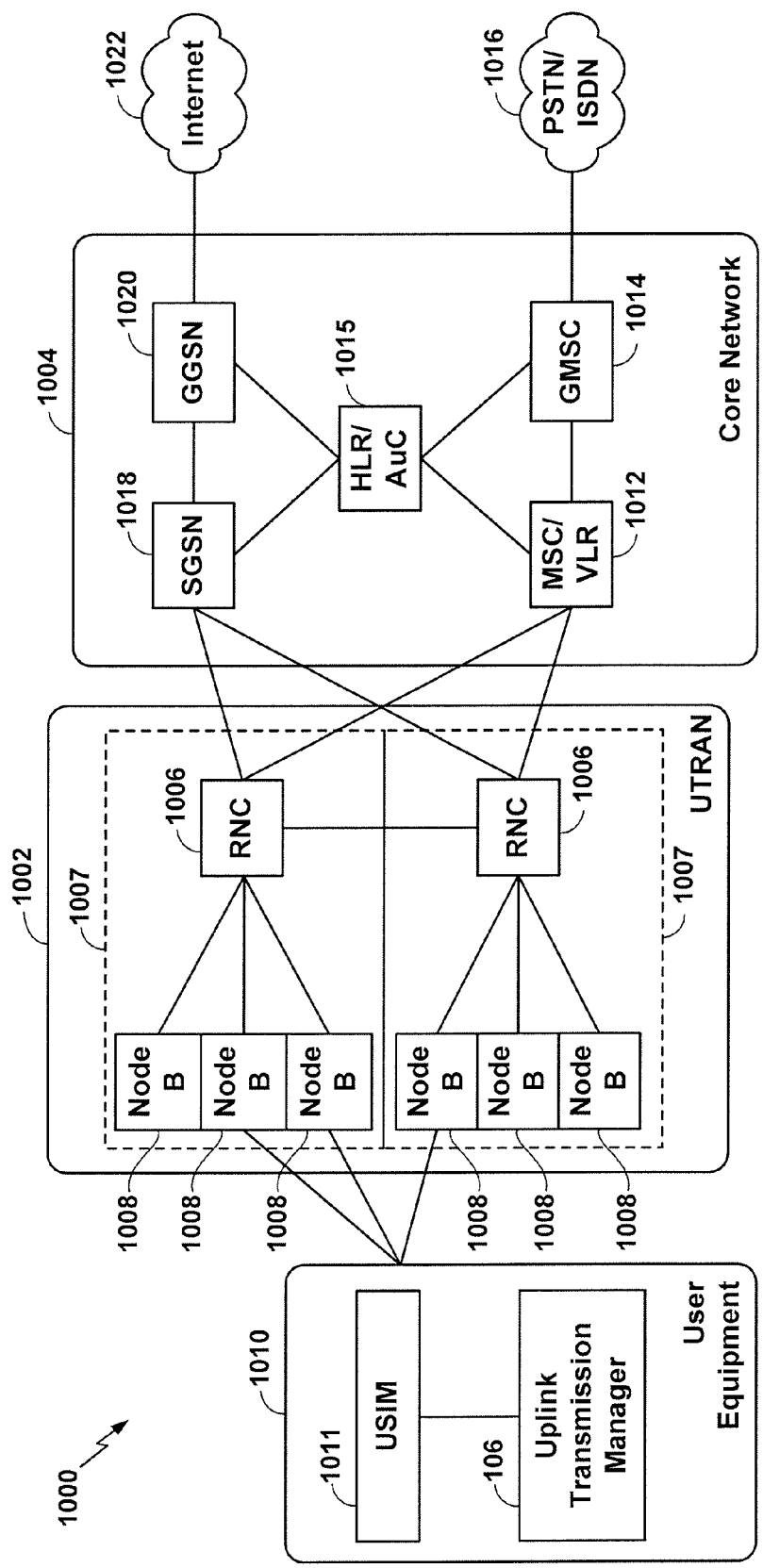
FIG. 10 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 10 are presented with reference to a UMTS system 1000 employing a W-CDMA air interface. A UMTS network includes three interacting domains: a Core Network (CN) 1004, a UMTS Terrestrial Radio Access Network (UTRAN) 1002, and User Equipment (UE) 1010 (e.g., which may be UE 102 of FIG. 1). In this example, the UTRAN 1002 provides various wireless services including telephony, video, data, messaging, broadcasts, and/or other services. The UTRAN 1002 may include a plurality of Radio Network Subsystems (RNSs) such as an RNS 1007, each controlled by a respective Radio Network Controller (RNC) such as an RNC 1006. Here, the UTRAN 1002 may include any number of RNCs 1006 and RNSs 1007 in addition to the RNCs 1006 and RNSs 1007 illustrated herein. Each of these RNCs may be the network entity 104 of FIG. 1. The RNC 1006 is an apparatus responsible for, among other things, assigning, reconfiguring and releasing radio resources within the RNS 1007. The RNC 1006 may be interconnected to other RNCs (not shown) in the UTRAN 1002 through various types of interfaces such as a direct physical connection, a virtual network, or the like, using any suitable transport network.

Communication between a UE 1010 and a Node B 1008 (which may be the network entity 104 of FIG. 1) may be considered as including a physical (PHY) layer and a medium access control (MAC) layer. Further, communication between a UE 1010 and an RNC 1006 by way of a respective Node B 1008 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the SRNS 1007 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 1008 are shown in each SRNS 1007; however, the SRNSs 1007 may include any number of wireless Node Bs. The Node Bs 1008 provide wireless access points to a core network (CN) 1004 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 1010 may further include a universal subscriber identity module (USIM) 1011, which contains a user's subscription information to a network. In addition, UE 1010 may include uplink transmission manager 106, the composition and functionality of which are described throughout the present disclosure (see, e.g., FIGS. 1-4). For illustrative purposes, one UE 1010 is shown in communication with a number of the Node Bs 1008. The downlink (DL), also called the forward link, refers to the communication link from a Node B 1008 to a UE 1010, and the uplink (UL), also called the reverse link, refers to the communication link from a UE 1010 to a Node B 1008.

The core network 1004 interfaces with one or more access networks, such as the UTRAN 1002. As shown, the core network 1004 is a GSM core network. However, as those skilled in the art will recognize, the various concepts presented throughout this disclosure may be implemented in a RAN, or other suitable access network, to provide UEs with access to types of core networks other than GSM networks.

The core network 1004 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 1004 supports circuit-switched services with a MSC 1012 and a GMSC 1014. In some applications, the GMSC 1014 may be referred to as a media gateway (MGW). One or more RNCs, such as the RNC 1006, may be connected to the MSC 1012. The MSC 1012 is an apparatus that controls call setup, call routing, and UE mobility functions. The MSC 1012 also includes a visitor location register (VLR) that contains subscriber-related information for the duration that a UE is in the coverage area of the MSC 1012. The GMSC 1014 provides a gateway through the MSC 1012 for the UE to access a circuit-switched network 1016. The core network 1004 includes a home location register (HLR) 1015 containing subscriber data, such as the data reflecting the details of the services to which a particular user has subscribed. The HLR is also associated with an authentication center (AuC) that contains subscriber-specific authentication data. When a call is received for a particular UE, the GMSC 1014 queries the HLR 1015 to determine the UE's location and forwards the call to the particular MSC serving that location.

The core network 1004 also supports packet-data services with a serving GPRS support node (SGSN) 1018 and a gateway GPRS support node (GGSN) 1020. GPRS, which stands for General Packet Radio Service, is designed to provide packet-data services at speeds higher than those available with standard circuit-switched data services. The GGSN 1020 provides a connection for the UTRAN 1002 to a packet-based network 1022. The packet-based network 1022 may be the Internet, a private data network, or some other suitable packet-based network. The primary function of the GGSN 1020 is to provide the UEs 1010 with packet-based network connectivity. Data packets may be transferred between the GGSN 1020 and the UEs 1010 through the SGSN 1018, which performs primarily the same functions in the packet-based domain as the MSC 1012 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 1008 and a UE 1010. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 11:
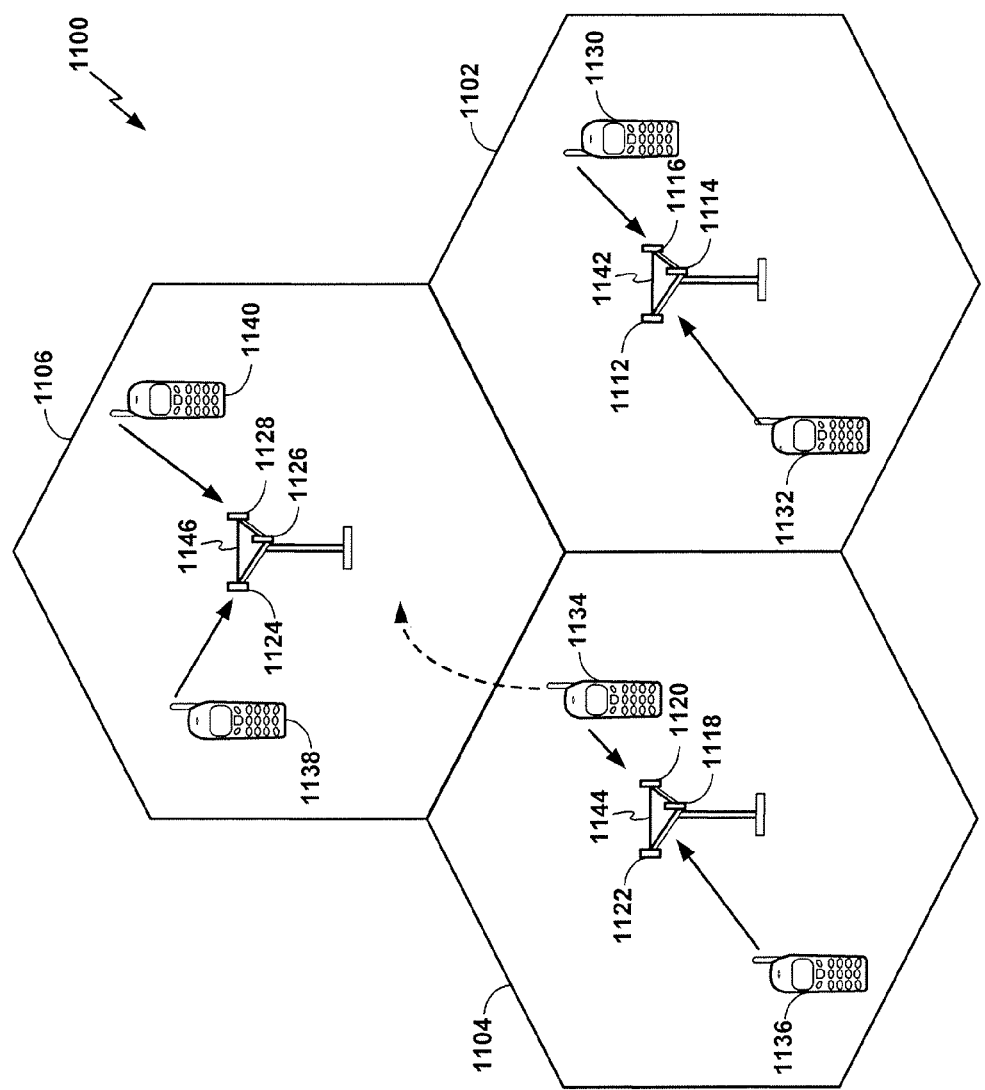
FIG. 11 is a conceptual diagram illustrating an example of an access network.

Referring to FIG. 11, an access network 1100 in a UTRAN architecture is illustrated. The multiple access wireless communication system includes multiple cellular regions (cells), including cells 1102, 1104, and 1106, each of which may include one or more sectors. The multiple sectors can be formed by groups of antennas with each antenna responsible for communication with UEs in a portion of the cell. For example, in cell 1102, antenna groups 1112, 1114, and 1116 may each correspond to a different sector. In cell 1104, antenna groups 1118, 1120, and 1122 each correspond to a different sector. In cell 1106, antenna groups 1124, 1126, and 1128 each correspond to a different sector. The cells 1102, 1104 and 1106 may include several wireless communication devices, e.g., User Equipment or UEs, which may be in communication with one or more sectors of each cell 1102, 1104 or 1106, and may represent UE 102 of FIG. 1 having an uplink transmission manager 106 as described herein. For example, UEs 1130 and 1132 may be in communication with Node B 1142, UEs 1134 and 1136 may be in communication with Node B 1144, and UEs 1138 and 1140 can be in communication with Node B 1146. Here, each Node B 1142, 1144, 1146 is configured to provide an access point to a core network 1004 (see FIG. 10) for all the UEs 1130, 1132, 1134, 1136, 1138, 1140 in the respective cells 1102, 1104, and 1106.

As the UE 1134 moves from the illustrated location in cell 1104 into cell 1106, a serving cell change (SCC) or handover may occur in which communication with the UE 1134 transitions from the cell 1104, which may be referred to as the source cell, to cell 1106, which may be referred to as the target cell. Management of the handover procedure may take place at the UE 1134, at the Node Bs corresponding to the respective cells, at a radio network controller 1006 (see FIG. 10), or at another suitable node in the wireless network. For example, during a call with the source cell 1104, or at any other time, the UE 1134 may monitor various parameters of the source cell 1104 as well as various parameters of neighboring cells such as cells 1106 and 1102. Further, depending on the quality of these parameters, the UE 1134 may maintain communication with one or more of the neighboring cells. During this time, the UE 1134 may maintain an Active Set, that is, a list of cells that the UE 1134 is simultaneously connected to (i.e., the UTRA cells that are currently assigning a downlink dedicated physical channel DPCH or fractional downlink dedicated physical channel F-DPCH to the UE 1134 may constitute the Active Set).

The modulation and multiple access scheme employed by the access network 1100 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 12:
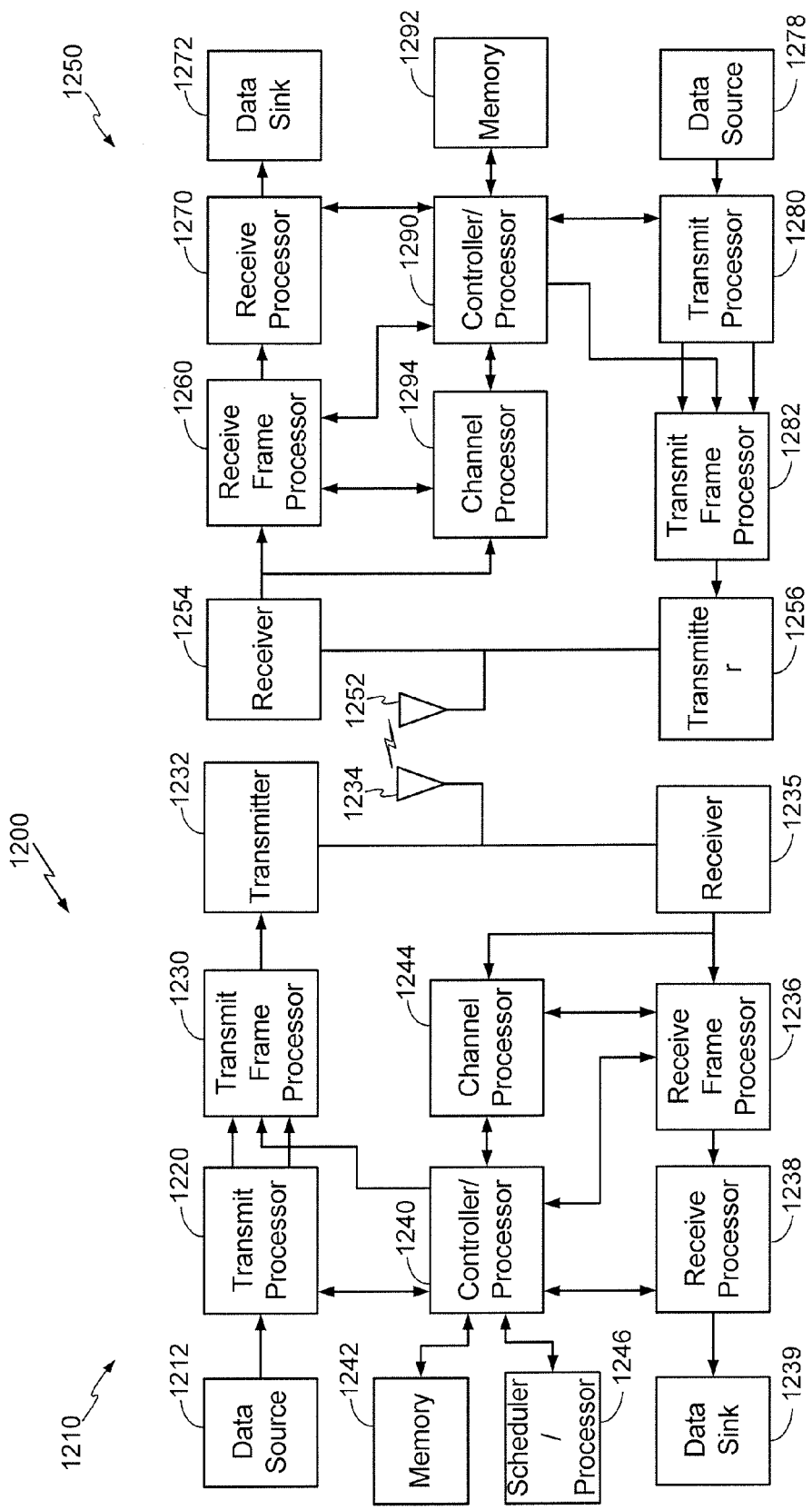
FIG. 12 is a block diagram conceptually illustrating an example of a Node B in communication with a UE in a telecommunications system.

FIG. 12 is a block diagram of a Node B 1210 in communication with a UE 1250, where the Node B 1210 may be the network entity 104 in FIG. 1 having the downlink transmission manager 107, and the UE 1250 may be the UE 102 in FIG. 1 having the uplink transmission manager 106. In the downlink communication, a transmit processor 1220 may receive data from a data source 1212 and control signals from a controller/processor 1240. The transmit processor 1220 provides various signal processing functions for the data and control signals, as well as reference signals (e.g., pilot signals). For example, the transmit processor 1220 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1244 may be used by a controller/processor 1240 to determine the coding, modulation, spreading, and/or scrambling schemes for the transmit processor 1220. These channel estimates may be derived from a reference signal transmitted by the UE 1250 or from feedback from the UE 1250. The symbols generated by the transmit processor 1220 are provided to a transmit frame processor 1230 to create a frame structure. The transmit frame processor 1230 creates this frame structure by multiplexing the symbols with information from the controller/processor 1240, resulting in a series of frames. The frames are then provided to a transmitter 1232, which provides various signal conditioning functions including amplifying, filtering, and modulating the frames onto a carrier for downlink transmission over the wireless medium through antenna 1234. The antenna 1234 may include one or more antennas, for example, including beam steering bidirectional adaptive antenna arrays or other similar beam technologies.

At the UE 1250, a receiver 1254 receives the downlink transmission through an antenna 1252 and processes the transmission to recover the information modulated onto the carrier. The information recovered by the receiver 1254 is provided to a receive frame processor 1260, which parses each frame, and provides information from the frames to a channel processor 1294 and the data, control, and reference signals to a receive processor 1270. The receive processor 1270 then performs the inverse of the processing performed by the transmit processor 1220 in the Node B 1210. More specifically, the receive processor 1270 descrambles and despreads the symbols, and then determines the most likely signal constellation points transmitted by the Node B 1210 based on the modulation scheme. These soft decisions may be based on channel estimates computed by the channel processor 1294. The soft decisions are then decoded and deinterleaved to recover the data, control, and reference signals. The CRC codes are then checked to determine whether the frames were successfully decoded. The data carried by the successfully decoded frames will then be provided to a data sink 1272, which represents applications running in the UE 1250 and/or various user interfaces (e.g., display). Control signals carried by successfully decoded frames will be provided to a controller/processor 1290. When frames are unsuccessfully decoded by the receiver processor 1270, the controller/processor 1290 may also use an acknowledgement (ACK) and/or negative acknowledgement (NACK) protocol to support retransmission requests for those frames.

In the uplink, data from a data source 1278 and control signals from the controller/processor 1290 are provided to a transmit processor 1280. The data source 1278 may represent applications running in the UE 1250 and various user interfaces (e.g., keyboard). Similar to the functionality described in connection with the downlink transmission by the Node B 1210, the transmit processor 1280 provides various signal processing functions including CRC codes, coding and interleaving to facilitate FEC, mapping to signal constellations, spreading with OVSFs, and scrambling to produce a series of symbols. Channel estimates, derived by the channel processor 1294 from a reference signal transmitted by the Node B 1210 or from feedback contained in the midamble transmitted by the Node B 1210, may be used to select the appropriate coding, modulation, spreading, and/or scrambling schemes. The symbols produced by the transmit processor 1280 will be provided to a transmit frame processor 1282 to create a frame structure. The transmit frame processor 1282 creates this frame structure by multiplexing the symbols with information from the controller/ processor 1290, resulting in a series of frames. The frames are then provided to a transmitter 1256, which provides various signal conditioning functions including amplification, filtering, and modulating the frames onto a carrier for uplink transmission over the wireless medium through the antenna 1252.

The uplink transmission is processed at the Node B 1210 in a manner similar to that described in connection with the receiver function at the UE 1250. A receiver 1235 receives the uplink transmission through the antenna 1234 and processes the transmission to recover the information modulated onto the carrier. The information recovered by the receiver 1235 is provided to a receive frame processor 1236, which parses each frame, and provides information from the frames to the channel processor 1244 and the data, control, and reference signals to a receive processor 1238. The receive processor 1238 performs the inverse of the processing performed by the transmit processor 1280 in the UE 1250. The data and control signals carried by the successfully decoded frames may then be provided to a data sink 1239 and the controller/processor, respectively. If some of the frames were unsuccessfully decoded by the receive processor, the controller/processor 1240 may also use an acknowledgement (ACK) and/or negative acknowledgement (NACK) protocol to support retransmission requests for those frames.

The controller/processors 1240 and 1290 may be used to direct the operation at the Node B 1210 and the UE 1250, respectively. For example, the controller/processors 1240 and 1290 may provide various functions including timing, peripheral interfaces, voltage regulation, power management, and other control functions. The computer readable media of memories 1242 and 1292 may store data and software for the Node B 1210 and the UE 1250, respectively. A scheduler/processor 1246 at the Node B 1210 may be used to allocate resources to the UEs and schedule downlink and/or uplink transmissions for the UEs.

Several aspects of a telecommunications system have been presented with reference to an HSPA system. As those skilled in the art will readily appreciate, various aspects described throughout this disclosure may be extended to other telecommunication systems, network architectures and communication standards.

By way of example, various aspects may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, or 35 U.S.C. §112(f), whichever is appropriate, unless the element is expressly recited using the phrase "means for" or, in the case of a method claim, the element is recited using the phrase "step for."

We claim:

1. A method of uplink mobile communication at a user equipment (UE), comprising:
   compressing two consecutive voice packets having a first voice packet transmission time interval (TTI) into two compressed voice packets having a second voice packet TTI;
   compressing signaling data corresponding to a first dedicated control channel (DCCH) TTI into compressed signaling data having a second DCCH TTI;
   multiplexing the two compressed voice packets and the compressed signaling data to form a multiplexed packet;
   splitting the multiplexed packet into a first subpacket and a second subpacket;
   transmitting the first subpacket during a first subpacket interval having a subpacket TTI; and
   transmitting the second subpacket during a second subpacket interval subsequent to the first subpacket interval, wherein the second subpacket interval has the subpacket TTI.

2. The method of claim 1, further comprising pausing transmission for a time interval following the transmission of each of the first subpacket and the second subpacket.

3. The method of claim 2, wherein the time interval comprises a discontinuous transmission (DTX) interval.

4. The method of claim 1, wherein the second DCCH TTI corresponds to half of the first DCCH TTI.

5. The method of claim 1, wherein each of the two compressed voice packets have a second voice packet TTI corresponding to half of the first voice packet TTI.

6. The method of claim 1, wherein the second DCCH TTI corresponds to twice the second voice packet TTI.

7. The method of claim 1, wherein the first voice packet TTI is 20 ms in duration.

8. The method of claim 1, wherein each of the first subpacket and the second subpacket have a subpacket TTI corresponding to the second voice packet TTI.

9. An apparatus, comprising:
   a voice packet compression component configured to compress two consecutive voice packets having a first voice packet transmission time interval (TTI) into two compressed voice packets having a second voice packet TTI;
   a signaling data compression component configured to compress signaling data corresponding to a first dedicated control channel (DCCH) TTI into compressed signaling data having a second DCCH TTI;
   a multiplexing component configured to multiplex the two compressed voice packets and the compressed signaling data to form a multiplexed packet;
   a packet splitting component configured to split the multiplexed packet into a first subpacket and a second subpacket; and
   a transmitting component configured to:
      transmit the first subpacket during a first subpacket interval having a subpacket TTI, and
      transmit the second subpacket during a second subpacket interval subsequent to the first subpacket interval, wherein the second subpacket interval has the subpacket TTI.

10. The apparatus of claim 9, wherein the transmitting component is further configured to pause transmission for a time interval following the transmission of each of the first subpacket and the second subpacket.

11. The apparatus of claim 10, wherein the time interval comprises a discontinuous transmission (DTX) interval.

12. The apparatus of claim 9, wherein the second DCCH TTI corresponds to half of the first DCCH TTI.

13. The apparatus of claim 9, wherein each of the two compressed voice packets have a second voice packet TTI corresponding to half of the first voice packet TTI.

14. The apparatus of claim 9, wherein the second DCCH TTI corresponds to twice the second voice packet TTI.

15. The apparatus of claim 9, wherein the first voice packet TTI is 20 ms in duration.

16. The apparatus of claim 9, wherein each of the first subpacket and the second subpacket have a subpacket TTI corresponding to the second voice packet TTI.

17. An apparatus for uplink mobile communication, comprising:
   means for compressing two consecutive voice packets having a first voice packet transmission time interval (TTI) into two compressed voice packets having a second voice packet TTI;
   means for compressing signaling data corresponding to a first dedicated control channel (DCCH) TTI into compressed signaling data having a second DCCH TTI;
   means for multiplexing the two compressed voice packets and the compressed signaling data to form a multiplexed packet;
   means for splitting the multiplexed packet into a first subpacket and a second subpacket;
   means for transmitting the first subpacket during a first subpacket interval having a subpacket TTI; and
   means for transmitting the second subpacket during a second subpacket interval subsequent to the first subpacket interval, wherein the second subpacket interval has the subpacket TTI.

18. The apparatus of claim 17, further comprising means for pausing transmission for a time interval following the transmission of each of the first subpacket and the second subpacket.

19. The apparatus of claim 18, wherein the time interval comprises a discontinuous transmission (DTX) interval.

20. The apparatus of claim 17, wherein the second DCCH TTI corresponds to half of the first DCCH TTI.

21. The apparatus of claim 17, wherein each of the two compressed voice packets have a second voice packet TTI corresponding to half of the first voice packet TTI.

22. The apparatus of claim 17, wherein the second DCCH TTI corresponds to twice the second voice packet TTI.

23. The apparatus of claim 17, wherein the first voice packet TTI is 20 ms in duration.

24. The apparatus of claim 17, wherein each of the first subpacket and the second subpacket have a subpacket TTI corresponding to the second voice packet TTI.

25. A method of mobile communication at a network entity, comprising:
   transmitting, at a power level, one or more packets to a user equipment (UE) on a downlink communication channel during a first transmission interval;
   disabling inner-loop power control for the downlink communication channel over a second transmission interval;
   receiving, during the second transmission interval, a first transmission power control (TPC) command from the UE;

adjusting the power level to an adjusted power level based on the first TPC command; and transmitting, at the adjusted power level, one or more packets to the UE on the downlink communication channel.

26. The method of claim 25, wherein transmitting the one or more packets to the UE at the adjusted power level comprises transmitting the one or more packets during a third transmission interval following the second transmission interval.

27. The method of claim 25, wherein transmitting the one or more packets to the UE at the adjusted power level comprises transmitting the one or more packets during the second transmission interval.

28. The method of claim 25, further comprising:
receiving one or more uplink transmissions from a UE over an uplink communication channel;
generating a downlink TPC command based on at least one of the one or more uplink transmissions;
transmitting the downlink TPC command to the UE during the second transmission interval.

29. A method of inner-loop power control for discontinuous wireless signal transmission, comprising:

transmitting, at a power level, one or more signals on a dedicated communication channel during a first transmission interval;

pausing transmission on the dedicated communication channel during a discontinuous transmission (DTX) interval following the first transmission interval;

receiving, during the DTX interval, a transmission power control (TPC) command, wherein the TPC command is based on a quality metric of at least one of the one or more signals;

adjusting the power level to an adjusted power level based on the TPC command; and transmitting, at the adjusted power level, one or more further signals on the dedicated communication channel during a second transmission interval following the DTX interval.

30. The method of claim 29, wherein the dedicated communication channel comprises one of a downlink dedicated communication channel or an uplink dedicated communication channel.

* * * * *